US012781086B2

(12) United States Patent
Takahira et al.

(10) Patent No.: US 12,781,086 B2
(45) Date of Patent: Nov. 3, 2026

(54) WATER-BASED PAINT COMPOSITION AND HARDENED COATING FILM THEREOF, AND COATED ARTICLE

(71) Applicant: TOYOTA JIDOSHA KABUSHIKI KAISHA, Toyota (JP)

(72) Inventors: Takayoshi Takahira, Toyota (JP); Seiji Horii, Toyota (JP); Toshiki Sawaue, Toyota (JP); Toru Tanaka, Toyota (JP); Hidetaka Asano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 712 days.

(21) Appl. No.: 18/166,300

(22) Filed: Feb. 8, 2023

(65) Prior Publication Data

US 2023/0250310 A1 Aug. 10, 2023

(30) Foreign Application Priority Data

Feb. 9, 2022 (JP) ................................ 2022-018578

(51) Int. Cl.
*C09D 5/02* (2006.01)
*B01J 23/34* (2006.01)
*B01J 35/59* (2024.01)
*B01J 37/00* (2006.01)
*C09D 133/08* (2006.01)

(52) U.S. Cl.
CPC ............ *C09D 133/08* (2013.01); *B01J 23/34* (2013.01); *B01J 35/59* (2024.01); *B01J 37/0072* (2013.01); *C09D 5/027* (2013.01)

(58) Field of Classification Search
CPC .... C09D 133/00; C09D 133/08; C09D 5/027; C09D 127/12; C08K 3/04; C08K 2003/2262; C08K 7/24; C08K 3/22
See application file for complete search history.

(56) References Cited

U.S. PATENT DOCUMENTS 6,375,902 B1 4/2002 Moini et al.
11,613,660 B2 * 3/2023 Takahira .................. B01J 21/10
524/502
11,905,437 B2 * 2/2024 Takahira .............. C09D 133/08
12,398,898 B2 * 8/2025 Tanaka ...................... F24F 8/10
(Continued)

FOREIGN PATENT DOCUMENTS

CN 1657576 A 8/2005
CN 102181215 A * 9/2011
(Continued)

OTHER PUBLICATIONS

Machine translation of Wang CN-111269632-A, Jun. 12, 2020.*
(Continued)

*Primary Examiner* — Jun Li
(74) *Attorney, Agent, or Firm* — Sughrue Mion, PLLC

(57) ABSTRACT

A water-based paint composition includes a manganese oxide-based catalyst, activated carbon, at least one water-soluble resin selected from a group consisting of acrylic resin, modified acrylic resin, and fluorocarbon resin, a polyacrylate-based dispersant, and a water-based solvent. The water-based paint composition, although including the manganese oxide-based catalyst, allows a coating film to be resistant to chalking and weather.

2 Claims, 3 Drawing Sheets

(56) References Cited

U.S. PATENT DOCUMENTS

| | | | | |
|---|---|---|---|---|
| 2007/0060472 | A1* | 3/2007 | Fisher | B01D 53/8675 502/238 |
| 2012/0015246 | A1* | 1/2012 | Amin-Sanayei | C08K 5/1565 252/511 |
| 2014/0255283 | A1 | 9/2014 | Sidheswaran et al. | |
| 2019/0077950 | A1* | 3/2019 | Hintzer | C08K 3/046 |
| 2020/0299526 | A1* | 9/2020 | Takahira | C09D 133/06 |

FOREIGN PATENT DOCUMENTS

| | | | | |
|---|---|---|---|---|
| CN | 111269632 | A * | 6/2020 | C09D 7/61 |
| CN | 111378335 | A | 7/2020 | |
| CN | 111718625 | A | 9/2020 | |
| JP | 2003-525324 | A | 8/2003 | |
| JP | 2007-296058 | A | 11/2007 | |
| JP | 2011-111639 | A | 6/2011 | |
| JP | 5672373 | B2 | 1/2015 | |
| JP | 2015-66478 | A | 4/2015 | |
| JP | 2015-129222 | A | 7/2015 | |
| JP | 2020-152871 | A | 9/2020 | |
| JP | 2002-13546 | A | 1/2022 | |
| JP | 2022-13546 | A | 1/2022 | |
| WO | 2014/111292 | A1 | 7/2014 | |

OTHER PUBLICATIONS

Communication dated Nov. 29, 2024 in Chinese Application No. 202310124927.5.

Communication dated Dec. 27, 2012 in Taiwanese Application No. 111147361.

Japanese Office Action dated Dec. 26, 2023 in Application No. 2022-018578.

Office Action issued May 7, 2024 in Japanese Application No. 2022-018578.

Office Action issued Mar. 30, 2024 in Chinese Application No. 202310124927.5.

Office Action issued Aug. 6, 2024 in Japanese Application No. 2022-018578.

Indian Office Action dated Oct. 16, 2025, issued in Indian application No. 202314007019.

* cited by examiner

WATER-BASED PAINT COMPOSITION AND HARDENED COATING FILM THEREOF, AND COATED ARTICLE

IN CORPORATION BY REFERENCE

The present invention is based on Japanese Patent Application No. 2022-18578, filed on Feb. 9, 2022, the contents of which are hereby incorporated by reference.

TECHNICAL FIELD

The present invention relates to a water-based paint composition, a hardened coating film of the water-based paint composition, and a coated article, specifically, coated articles exposed to air flow, such as vehicle components and blowers. The present invention enables ozone in air to be decomposed and thus enables the air to be purified. In particular, the present invention relates to a water-based paint composition, a hardened coating film of the water-based paint composition, and a coated article that enable the coating film to be highly weather resistance.

BACKGROUND ART

Nitrogen oxides (NOx) and volatile organic compounds (VOC) such as non-methane organic gases (NMOG) and hydrocarbons (HC), which are included in car exhaust or factory fumes, change to photochemical oxidants ($O_x$) through chemical reaction with oxygen in air or photochemical reaction with ultraviolet light of sunlight. Such photochemical oxidants, which are air pollutants or environmental load substances, mainly include ozone ($O_3$) and cause photochemical smog. Photochemical oxidants of 0.06 ppm or less per unit time are required as environmental standard in Japan. However, photochemical oxidants have exceeded the environmental standard. Meanwhile, worldwide environmental awareness rises. It is therefore desired to reduce photochemical oxidants rapidly.

Thus, to prevent the generation of photochemical smog, the applicants have been created the water-based paint composition disclosed in Japanese Unexamined Patent Application Publication No. 2020-152871 (Japanese Patent No. 6945938). This water-based paint composition is applicable to a site exposed to air and enables ozone in air to be decomposed and thus the air to be purified. In particular, this water-based paint composition includes a manganese oxide-based catalyst and activated carbon and thus provide high ozone decomposition performance.

Technical Problem

Unfortunately, coating film, including the manganese oxide-based catalyst and the activated carbon, which are ozone decomposition catalysts, exhibits poor weather resistance. This is because the manganese oxide-based catalyst included in the coating film absorbs light and thus exhibits photocatalysis to cause or prompt the degradation or decomposition of coating film components. It may be also considered that the coating film, which includes the manganese oxide-based catalyst and the activated carbon and thus exhibits ozone decomposition performance, generate oxygen through ozone decomposition and the oxygen prompts the oxidative degradation of the coating film.

The application of the water-based paint composition including the manganese oxide-based catalyst and the activated carbon to a site exposed to air flow enables the coating film of the water-based paint composition to be in contact with air and thus ozone in air to be advantageously decomposed and the air to be purified. For cars, the application of the water-based paint composition to a site where a large amount of air flows such as a radiator, an electric fan near a radiator, and a grill shutter near a radiator in which a large amount of air flows through car traveling or fun rotation enables ozone to be reduced to oxygen and air to be purified advantageously.

Unfortunately, such car parts, specifically, exterior parts are exposed to light. Thus, the coating film applied to such parts is prone to chalking since the manganese oxide-based catalyst included in the coating film has photocatalysis and causes the degradation of resin near the manganese oxide-based catalyst and the breakdown of bond between the resin and the manganese oxide-based catalyst.

It is an object of the present invention to provide a water-based paint composition, a hardened coating film of the water-based paint composition, and a coated article that enable the coating film, although including a manganese oxide-based catalyst, to be less prone to chalking and be highly weather resistance.

Solution to Problem

A water-based paint composition according to a first aspect of the present invention includes a manganese oxide-based catalyst as an ozone decomposition catalyst, activated carbon with ozone adsorption capacity, a dispersant, a water-based solvent, and at least one water-soluble resin selected from a group consisting of a (meth) acrylic resin, a modified acrylic resin, and a fluorocarbon resin.

The manganese oxide-based catalyst has ozone decomposition catalysis. As the manganese oxide-based catalyst, metal oxides such as manganese oxides and manganese dioxides are employed. Especially, a manganese dioxide-based catalyst, which has high catalytic activity, are preferred.

As the activated carbon, for example, palm shell activated carbon, petroleum pitch-based activated carbon, or woody activated carbon, which have a high specific surface area which ozone adsorb onto, may be employed. Among these, activated carbon of palm shell is preferred.

The water-soluble resin may be also called a water-dispersible resin or aqueous resin. The water-soluble resin is a resin that is soluble or dispersed in water or water-based solvents.

In the water-based paint composition according to the first aspect of the present invention, the content of the water-soluble resin is preferably in a range of 20 to 400 parts by mass, more preferably 25 to 350 parts by mass, further preferably 30 to 300 parts by mass, per 100 parts by mass of the total content of the manganese oxide-based catalyst and the activated carbon.

In the water-based paint composition according to the first aspect of the present invention, the content of the at least one water-soluble resin is preferably in a range of 30 to 500 parts by mass, more preferably 40 to 480 parts by mass, further preferably 45 to 450 parts by mass, per 100 parts by mass of the manganese oxide-based catalyst.

In the water-based paint composition according to the first aspect of the present invention, the acrylic resin has a glass transition temperature $T_g$ of −30 to 130° C., preferably −25 to 120° C. or the modified acrylic resin has a glass transition temperature $T_g$ of −30 to 130° C., preferably −25 to 120° C.

In the water-based paint composition according to the first aspect of the present invention, the fluorocarbon resin has a glass transition temperature $T_g$ of −30 to 100° C., preferably −25 to 90° C.

In the water-based paint composition according to the first aspect of the present invention, the total content of the manganese oxide-based catalyst and the activated carbon is preferably in a range of 25 to 75 parts by mass, more preferably 30 to 65 parts by mass, per 100 parts by mass of the total content of the manganese oxide-based catalyst, the activated carbon, and the at least one water-soluble resin.

In the water-based paint composition according to the first aspect of the present invention, the content of manganese oxide-based catalyst is preferably in a range of 11 to 900 parts by mass, more preferably 15 to 800 parts by mass, further preferably 20 to 700 parts by mass, per 100 parts by mass of the activated carbon.

In the water-based paint composition according to the first aspect of the present invention, the content of the manganese oxide-based catalyst is preferably in a range of 5 to 65 parts by mass, more preferably 10 to 60 parts by mass, further preferably 15 to 55 parts by mass, per 100 parts by mass of the total content of the manganese oxide-based catalyst, the activated carbon, and the at least one water-soluble resin.

A hardened coating film according to a second aspect of the present invention includes a manganese oxide-based catalyst, activated carbon, and at least one water-soluble resin selected from a group consisting of a (meth) acrylic resin, a modified acrylic resin, and a fluorocarbon resin.

In the hardened coating film according to the second aspect of the present invention, the content of the water-soluble resin is preferably in a range of 20 to 400 parts by mass, more preferably 25 to 350 parts by mass, further preferably 30 to 300 parts by mass, per 100 parts by mass of the total content of the manganese oxide-based catalyst and the activated carbon.

In the hardened coating film according to the second aspect of the present invention, the content of the at least one water-soluble resin is preferably in a range of 30 to 500 parts by mass, more preferably 40 to 480 parts by mass, further preferably 45 to 450 parts by mass, per 100 parts by mass of the manganese oxide-based catalyst.

In the hardened coating film according to the second aspect of the present invention, the acrylic resin has a glass transition temperature $T_g$ of −30 to 130° C., preferably −25 to 120° C. or the modified acrylic resin has a glass transition temperature $T_g$ of −30 to 130° C., preferably −25 to 120° C.

In the hardened coating film according to the second aspect of the present invention, the fluorocarbon resin has a glass transition temperature $T_g$ of −30 to 100° C., preferably −25 to 90° C.

In the hardened coating film according to the second aspect of the present invention, the total content of the manganese oxide-based catalyst and the activated carbon is preferably in a range of 25 to 75 parts by mass, more preferably 30 to 65 parts by mass, per 100 parts by mass of the total content of the manganese oxide-based catalyst, the activated carbon, and the at least one water-soluble resin.

In the hardened coating film according to the second aspect of the present invention, the content of manganese oxide-based catalyst is preferably in a range of 11 to 900 parts by mass, more preferably 15 to 800 parts by mass, further preferably 20 to 700 parts by mass, per 100 parts by mass of the activated carbon.

In the hardened coating film according to the second aspect of the present invention, the content of the manganese oxide-based catalyst is preferably in a range of 5 to 65 parts by mass, more preferably 10 to 60 parts by mass, further preferably 15 to 55 parts by mass, per 100 parts by mass of the total content of the manganese oxide-based catalyst, the activated carbon, and the at least one water-soluble resin.

A coated article according to a third aspect of the present invention includes a base and a hardened coating film formed on the base. The hardened coating film includes a manganese oxide-based catalyst, activated carbon, and at least one of a (meth) acrylic resin, a modified acrylic resin, or a fluorocarbon resin as a water-soluble resin.

The coated article, which may be any parts, products and finished products, has the base coated with the hardened coating film including a manganese oxide-based catalyst, activated carbon, and at least one water-soluble resin selected from the group consisting of a (meth) acrylic resin, a modified acrylic resin, and a fluorocarbon resin. Examples of the article include vehicle components such as car components including exterior components, building materials such as roofs and exterior walls, the components of electrical appliances including blowers, and agricultural or horticultural materials such as vinyl houses and vinyl sheets. More specific examples of the article include filters, honeycomb components, and fans.

Advantageous Effects of Invention

In a first aspect of the present invention, a water-based paint composition includes a manganese oxide-based catalyst, activated carbon, a dispersant, a water-based solvent, and at least one water-soluble resin selected from a group consisting of an acrylic resin, a modified acrylic resin, and a fluorocarbon resin.

The water-based paint composition including a manganese oxide-based catalyst, activated carbon, at least one water-soluble resin, a dispersant, and a water-based solvent is to be applied to a base and then dried to give a hardened coating film.

We have found that a water-based paint composition including at least one water-soluble resin selected from a group consisting of an acrylic resin, a modified acrylic resin, and a fluorocarbon resin as a binder allows a hardened coating film of the water-based paint composition to be resistant to chalking even though the hardened coating film includes a manganese oxide-based catalyst.

The degradation mechanism or degradation factor caused by light, oxidation, moisture presence differs from polymers to polymers. The degradation mechanism of polymers also varies with components included in a coating film. Thus, the degradation mechanism of polymers depends on various or complex factors. However, the water-soluble resin selected from a group consisting of an acrylic resin, a modified acrylic resin, and a fluorocarbon resin as a binder allows the coating film, although including the manganese oxide-based catalyst and even exposed to sunlight, to less prone to chalking, to be highly resistant to weather, and to have high durability.

In the water-based paint composition according to the first aspect of the present invention, the content of the water-soluble resin is preferably in a range of 20 to 400 parts by mass, per 100 parts by mass of the total content of the manganese oxide-based catalyst and the activated carbon.

The higher content of the water-soluble resin selected from the group consisting of the acrylic resin, the modified acrylic resin, and the fluorocarbon resin to the manganese oxide-based catalyst and the activated carbon leads to the relatively lower content of the total solid content of the activated carbon and the manganese oxide-based catalyst and thus would fail to provide intended performance to decompose ozone. The lower content of the water-soluble resin to the manganese oxide-based catalyst and the activated carbon leads to the relatively lower content of the water-soluble resin as a binder and thus might cause the hardened coating film to be prone to degradation and be lowly resistant to chalking.

The preferable content of the water-soluble resin of 20 to 400 parts by mass, more preferably 25 to 350 parts by mass, further preferably 30 to 300 parts by mass, per 100 parts by mass of the total content of the manganese oxide-based catalyst and the activated carbon, enables the combination of high performance to decompose ozone and high weather resistance.

In the water-based paint composition according to the first aspect of the present invention, the content of the at least one water-soluble resin is preferably in a range of 30 to 500 parts by mass, per 100 parts by mass of the manganese oxide-based catalyst.

The higher content of the water-soluble resin selected from the group consisting of the acrylic resin, the modified acrylic resin, and the fluorocarbon resin to the manganese oxide-based catalyst leads to the relatively lower content of the manganese oxide-based catalyst with ozone decomposition performance and thus would provide less synergistic performance to decompose ozone between the manganese oxide-based catalyst and the activated carbon. The lower content of the water-soluble resin to the manganese oxide-based catalyst leads to the relatively lower content of the water-soluble resin as a binder would fail to provide intended resistance to chalking.

The preferable content of the water-soluble resin of 30 to 500 parts by mass, more preferably 40 to 480 parts by mass, further preferably 45 to 450 parts by mass, per 100 parts by mass of the manganese oxide-based catalyst, enables the combination of high performance to decompose ozone and high weather resistance.

In the water-based paint composition according to the first aspect of the present invention, the acrylic resin has a glass transition temperature $T_g$ of −30 to 130° C. or the modified acrylic resin has a glass transition temperature $T_g$ of −30 to 130° C.

We have found that the acrylic resin having a glass transition temperature $T_g$ of −30 to 130° C. and the modified acrylic resin having a glass transition temperature $T_g$ of −30 to 130° C. enable the hardened coating film to have higher resistance to weather.

Thus, the acrylic resin having a glass transition temperature $T_g$ of −30 to 130° C., more preferably −25 to 120° C. or the modified acrylic resin having a glass transition temperature $T_g$ of −30 to 130° C., more preferably −25 to 120° C. enables the hardened coating film, although including the manganese oxide-based catalyst and even if exposed to sunlight, to be less prone to chalking, to be resistant to weather, and to have high durability.

In the water-based paint composition according to the first aspect of the present invention, the fluorocarbon resin has a glass transition temperature $T_g$ of −30 to 100° C.

We have found that the fluorocarbon resin having a glass transition temperature $T_g$ of −30 to 100° C. enables the hardened coating film to have higher resistance to weather.

Thus, the fluorocarbon resin having a glass transition temperature $T_g$ of −30 to 100° C., more preferably −25 to 90° C. enables the hardened coating film, although including the manganese oxide-based catalyst and even if exposed to sunlight, to be less prone to chalking, to be resistant to weather, and to have high durability.

In the water-based paint composition according to the first aspect of the present invention, the total content of the manganese oxide-based catalyst and the activated carbon is preferably in a range of 25 to 75 parts by mass, per 100 parts by mass of the total content of the manganese oxide-based catalyst, the activated carbon, and the at least one water-soluble resin.

The higher concentration of the manganese oxide-based catalyst and the activated carbon, which are coating film components and have ozone decomposition performance, leads to the relatively lower content of the water-soluble resin as a binder and thus might cause the hardened coating film to be prone to degradation and to be lowly resistant to chalking. The lower concentration of the manganese oxide-based catalyst and the activated carbon would fail to provide intended performance to decompose ozone.

The preferable total content of the manganese oxide-based catalyst and the activated carbon of 25 to 75 parts by mass, more preferably 30 to 65 parts by mass, per 100 parts by mass of the total content of the manganese oxide-based catalyst, the activated carbon, and the at least one water-soluble resin, enables the combination of high performance to decompose ozone and high weather resistance.

In the water-based paint composition according to the first aspect of the present invention, the content of the manganese oxide-based catalyst is preferably in a range of 11 to 900 parts by mass, per 100 parts by mass of the content of the activated carbon.

The higher content of the manganese oxide-based catalyst to the activated carbon would fail to provide intended weather resistance. The lower content of the manganese oxide-based catalyst to the activated carbon leads to the relatively higher content of the activated carbon and thus might cause the activated carbon to prone to aggregate and to less prone to disperse, and decrease coatability.

The preferable content of the manganese oxide-based catalyst of 11 to 900 parts by mass, more preferably 15 to 800 parts by mass, further preferably 20 to 700, parts by mass per 100 parts by mass of the content of the activated carbon, enables the combination of high coatability and high weather resistance.

In the water-based paint composition according to the first aspect of the present invention, the content of the manganese oxide-based catalyst is preferably in a range of 5 to 65 parts by mass, per 100 parts by mass of the manganese oxide-based catalyst, the activated carbon, and the at least one water-soluble resin.

The higher concentration of the manganese oxide-based catalyst, which is coating film component, would fail to provide intended weather resistance. The lower concentration of the manganese oxide-based catalyst would provide less synergistic performance to decompose ozone between the manganese oxide-based catalyst and the activated carbon.

The preferable content of the manganese oxide-based catalyst of 5 to 65 parts by mass, more preferably 10 to 60 parts by mass, further preferably 15 to 55 parts by mass, per 100 parts by mass of the content of the manganese oxide-based catalyst, the activated carbon, and the at least one water-soluble resin, enables the combination of high performance to decompose ozone and high weather resistance.

In a second aspect of the present invention, a hardened coating film includes a manganese oxide-based catalyst, activated carbon, and at least one water-soluble resin selected from a group consisting of an acrylic resin, a modified acrylic resin, and a fluorocarbon resin.

The hardened coating film is obtained by applying a water-based paint composition including a manganese oxide-based catalyst, activated carbon, at least one water-soluble resin, a dispersant, and a water-based solvent to a base and drying it.

We have found that at least one water-soluble resin selected from a group consisting of an acrylic resin, a modified acrylic resin, and a fluorocarbon resin as a binder allows the hardened coating film of the water-based paint composition to be resistant to chalking even though the hardened coating film includes a manganese oxide-based.

The degradation mechanism or degradation factor caused by light, oxidation, moisture presence differs from polymers to polymers. The degradation mechanism of polymers also varies with a component included in a coating film. Thus, the degradation mechanism of polymers depends on various or complex factors. However, the water-soluble resin selected from a group consisting of an acrylic resin, a modified acrylic resin, and a fluorocarbon resin as a binder allows the coating film, although including the manganese oxide-based catalyst and even exposed to sunlight, to less prone to chalking, to be highly resistant to weather, and have high durability.

In the hardened coating film according to the second aspect of the present invention, the content of the water-soluble resin is preferably in a range of 20 to 400 parts by mass, per 100 parts by mass of the total content of the manganese oxide-based catalyst and the activated carbon.

The higher content of the water-soluble resin selected from the group consisting of the acrylic resin, the modified acrylic resin, and the fluorocarbon resin to the manganese oxide-based catalyst and the activated carbon leads to the relatively lower content of the total solid content of the activated carbon and the manganese oxide-based catalyst and thus would fail to provide intended performance to decompose ozone. The lower content of the water-soluble resin to the manganese oxide-based catalyst and the activated carbon leads to the relatively lower content of the water-soluble resin as a binder and thus might cause the hardened coating film to be prone to degradation and be lowly resistant to chalking.

The preferable content of the water-soluble resin of 20 to 400 parts by mass, more preferably 25 to 350 parts by mass, further preferably 30 to 300 parts by mass, per 100 parts by mass of the total content of the manganese oxide-based catalyst and the activated carbon, enables the combination of high performance to decompose ozone and high weather resistance.

In the hardened coating film according to the second aspect of the present invention, the content of the at least one water-soluble resin is preferably in a range of 30 to 500 parts by mass, per 100 parts by mass of the manganese oxide-based catalyst.

The higher content of the water-soluble resin selected from the group consisting of the acrylic resin, the modified acrylic resin, and the fluorocarbon resin to the manganese oxide-based catalyst leads to the relatively lower content of the manganese oxide-based catalyst with ozone decomposition performance and thus would provide less synergistic performance to decompose ozone between the manganese oxide-based catalyst and the activated carbon. The lower content of the water-soluble resin to the manganese oxide-based catalyst leads to the relatively lower content of the water-soluble resin as a binder would fail to provide intended resistance to chalking.

The preferable content of the water-soluble resin of 30 to 500 parts by mass, more preferably 40 to 480 parts by mass, further preferably 45 to 450 parts by mass, per 100 parts by mass of the manganese oxide-based catalyst, enables the combination of high performance to decompose ozone and high weather resistance.

In the hardened coating film according to the second aspect of the present invention, the acrylic resin has a glass transition temperature $T_g$ of −30 to 130° C. or the modified acrylic resin has a glass transition temperature $T_g$ of −30 to 130° C.

We have found that the acrylic resin having a glass transition temperature $T_g$ of −30 to 130° C. and the modified acrylic resin having a glass transition temperature $T_g$ of −30 to 130° C. enable the hardened coating film to have higher resistance to weather.

Thus, the acrylic resin having a glass transition temperature $T_g$ of −30 to 130° C., more preferably −25 to 120° C. or the modified acrylic resin having a glass transition temperature $T_g$ of −30 to 130° C., more preferably −25 to 120° C., enable the hardened coating film, although including the manganese oxide-based catalyst and even if exposed to sunlight, to be less prone to chalking, to be resistant to weather, and to have high durability.

In the hardened coating film according to the second aspect of the present invention, the fluorocarbon resin has a glass transition temperature $T_g$ of −30 to 100° C.

We have found that the fluorocarbon resin having a glass transition temperature $T_g$ of −30 to 100° C. enables the hardened coating film to have higher resistance to weather.

Thus, the fluorocarbon resin having a glass transition temperature $T_g$ of −30 to 100° C., more preferably −25 to 90° C. enables the hardened coating film, although including the manganese oxide-based catalyst and even if exposed to sunlight, to be less prone to chalking, to be resistant to weather and to have high durability.

In the hardened coating film according to the second aspect of the present invention, the total content of the manganese oxide-based catalyst and the activated carbon is preferably in a range of 25 to 75 parts by mass, per 100 parts by mass of the total content of the manganese oxide-based catalyst, the activated carbon, and the at least one water-soluble resin.

The higher concentration of the manganese oxide-based catalyst and the activated carbon, which are coating film components and have ozone decomposition performance, leads to the relatively lower content of the water-soluble resin as a binder and thus might cause the hardened coating film to be prone to degradation and be lowly resistant to chalking. The lower concentration of the manganese oxide-based catalyst and the activated carbon would fail to provide intended performance to decompose ozone.

The preferable total content of the manganese oxide-based catalyst and the activated carbon of 25 to 75 parts by mass, more preferably 30 to 65 parts by mass, per 100 parts by mass of the total content of the manganese oxide-based catalyst, the activated carbon, and the at least one water-soluble resin, enables the combination of high performance to decompose ozone and high weather resistance.

In the hardened coating film according to the second aspect of the present invention, the content of the manganese oxide-based catalyst is preferably in a range of 11 to 900 parts by mass, per 100 parts by mass of the content of the activated carbon.

The higher content of the manganese oxide-based catalyst to the activated carbon would fail to provide intended weather resistance. The lower content of the manganese oxide-based catalyst to the activated carbon leads to the relatively higher content of the activated carbon and thus might cause the activated carbon to prone to aggregate and to less prone to disperse and decrease coatability.

The preferable content of the manganese oxide-based catalyst of 11 to 900 parts by mass, more preferably 15 to 800 parts by mass, further preferably 20 to 700, parts by mass per 100 parts by mass of the content of the activated carbon, enables the combination of high coatability and high weather resistance.

In the hardened coating film according to the second aspect of the present invention, the content of the manganese oxide-based catalyst is preferably in a range of 5 to 65 parts by mass, per 100 parts by mass of the manganese oxide-based catalyst, the activated carbon, and the at least one water-soluble resin.

The higher concentration of the manganese oxide-based catalyst, which is coating film component, would fail to provide intended weather resistance. The lower concentration of the manganese oxide-based catalyst would provide less synergistic performance to decompose ozone between the manganese oxide-based catalyst and the activated carbon.

The preferable content of the manganese oxide-based catalyst of 5 to 65 parts by mass, more preferably 10 to 60 parts by mass, further preferably 15 to 55 parts by mass, per 100 parts by mass of the content of the manganese oxide-based catalyst, the activated carbon, and the at least one water-soluble resin, enables the combination of high performance to decompose ozone and high weather resistance.

In a third aspect of the present invention, a coated article includes a base and a hardened coating film formed on the base. The hardened coating film includes a manganese oxide-based catalyst, activated carbon, and at least one water-soluble resin selected from a group consisting of an acrylic resin, a modified acrylic resin, and a fluorocarbon resin.

The hardened coating film is obtained by applying a water-based paint composition including a manganese oxide-based catalyst, activated carbon, at least one water-soluble resin, a dispersant, and a water-based solvent to a base and drying it.

We have found that at least one water-soluble resin selected from a group consisting of an acrylic resin, a modified acrylic resin, and a fluorocarbon resin as a binder allows the hardened coating film of the water-based paint composition to be resistant to chalking even though the hardened coating film includes a manganese oxide-based.

The degradation mechanism or degradation factor caused by light, oxidation, moisture presence differs from polymers to polymers. The degradation mechanism of polymers also varies with a component included in a coating film. Thus, the degradation mechanism of polymers depends on various or complex factors. However, the water-soluble resin selected from the group consisting of an acrylic resin, a modified acrylic resin, and a fluorocarbon resin as a binder allows the coating film, although including the manganese oxide-based catalyst and even exposed to sunlight, to less prone to chalking, be highly resistant to weather, and to have high durability.

BRIEF DESCRIPTION OF DRAWINGS

FIG. 2 is a schematic view illustrating an example of a coated article which a water-based paint composition of a present embodiment is applied to.

FIG. 3 is a schematic view illustrating another example of a coated article which a water-based paint composition of a present embodiment is applied to.

DESCRIPTION OF EMBODIMENTS

Figure 1:
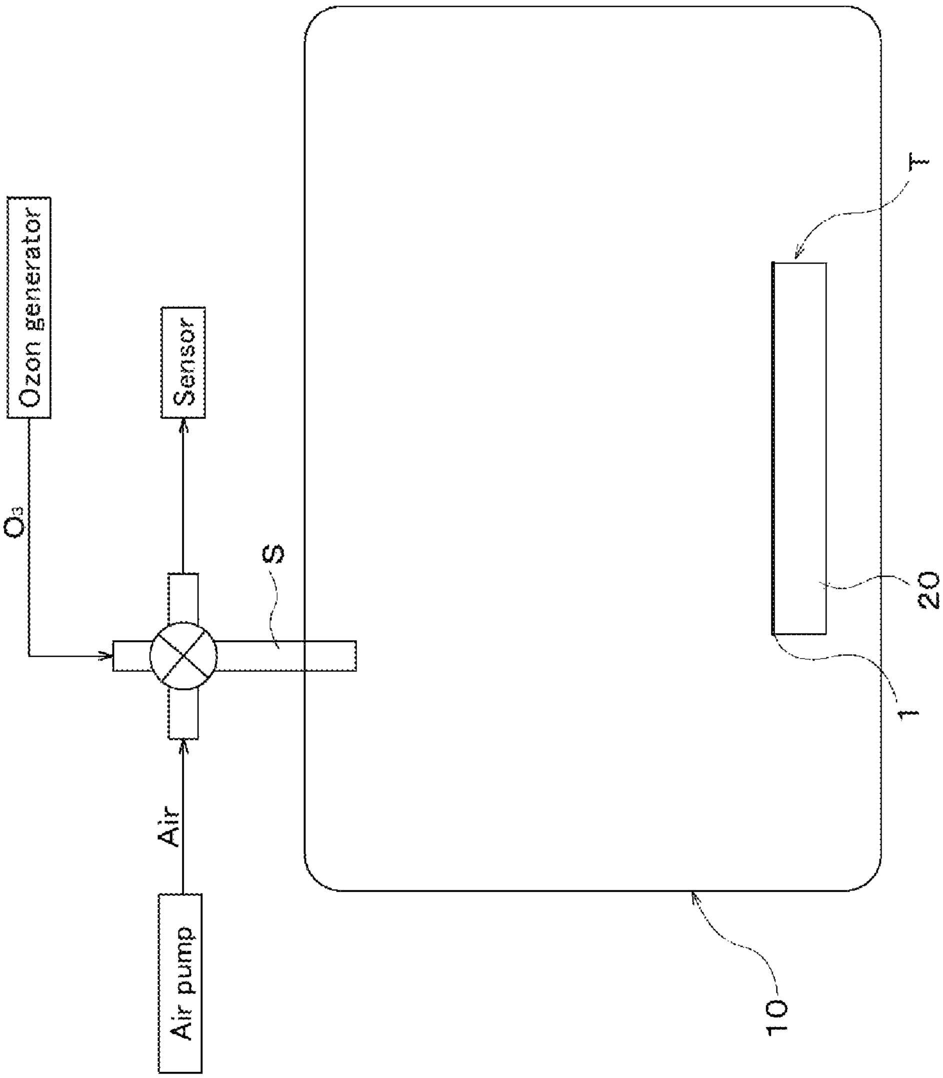
FIG. 1 is a schematic view illustrating an evaluation test way for evaluating ozone decomposition performance of a hardened coating film of a water-based paint composition of a present embodiment.

An embodiment of the present invention will be described hereafter with reference to FIGS. In the embodiment of the present invention, the same marks and the same codes mean the same or equivalent function parts. Thus, overlapped description thereof will be omitted.

A water-based paint composition according to an embodiment of the present invention will now be described.

The water-based paint composition according to the embodiment of the present invention includes a manganese oxide-based catalyst, activated carbon, a dispersant, at least one water-soluble resin, a pH adjuster, and a solvent including water as a principal component.

As the manganese oxide-based catalyst ($Mn_xO_y$-based catalyst), a manganese oxide such as a manganese monoxide-based catalyst (MnO-based catalyst), a manganese dioxide-based catalyst or a manganese (IV) oxide-based catalyst, a spinel metal manganese oxide, or the like may be employed. Among these, a manganese dioxide-based catalyst ($MnO_2$-based catalyst), which has high catalytic activity to decompose ozone and allows the coating film to have high performance to decompose ozone, is especially preferred. Manganese dioxide is substantially non-stoichiometric compound with the formula $MnO_x$ (X=1.93-2).

The manganese dioxide may be natural or synthetic, specifically produced using electrolysis method or chemical synthesis method. The manganese dioxide may have an amorphous structure or a crystal structure such as α-type, β-type, γ-type, or δ-type structure. Among these structures, a α-manganese dioxide with a cryptomelane structure is especially preferred. Alternatively, the manganese dioxide may have an amorphous structure.

The manganese dioxide-based catalyst, which includes a manganese dioxide ($MnO_2$) as a main component, may include NiO, CuO, or AgO as a co-catalyst. The manganese dioxide content is preferably 70% or more, more preferably 80% or more in the manganese dioxide-based catalyst.

The manganese oxide-based catalyst such as a manganese dioxide-based catalyst preferably has a specific surface area in a range of 100 to 400 $m^2/g$, which is determined by the Brunauer-Emmett-Teller (BET) method or the nitrogen adsorption method. The particulate catalyst having too high a specific surface area may agglomerate or flocculate easily and be less likely to be dispersed. The poor dispersion of the particulate catalyst may cause a paint nozzle to be clogged with the catalyst particles or the coating film to have paint seeding or agglomerate. The coating film having paint seeding or agglomerate may have poor film-forming or adhesion. Such a coating film may peel easily or the catalyst particles may drop from the coating film easily. Further, the poor dispersion stability of the particulate catalyst may fail to provide intended storage stability of the paint composition. The particulate catalyst having too low a specific surface area may fail to provide intended performance to decompose ozone. The catalyst particles having a specific surface area in a range of 100 to 400 $m^2/g$, which is determined by the BET method, are well dispersed and excellent in dispersion stability. Additionally, such a particulate catalyst allows the coating film to have excellent film-forming and adhesion. Such a coating film is less likely to drop the catalyst particles and exhibits high performance to decompose ozone for a long term. Further, the particulate catalyst having a specific surface area in a range of 100 to 400 $m^2/g$ allows the paint composition to have higher storage stability. A most preferred specific surface area determined by the BET method is in a range of 150 to 350 $m^2/g$, especially, 180 to 300 $m^2/g$.

The "specific surface area" is determined by the Brunauer-Emmett-Teller (BET) method. According to BET method, the volume of gas such as nitrogen adsorbed to the surface of the target particles is measured at the boiling point of liquid-nitrogen. The specific surface area is determined by physical adsorption of the gas on the surface of the target particles and by calculating the amount of adsorbate gas corresponding to a monomolecular layer on the surface.

The manganese oxide-based catalyst such as a manganese dioxide-based catalyst preferably has a median diameter in a range of 1 to 20 μm. The median diameter may be comparable to an average particle size. The particulate catalyst having too large a size has a low surface area and thus may fail to exhibit intended performance to decompose ozone. The particulate catalyst having too large a size may cause the coating film to have poor film-forming or adhesion. Such a coating film may peel easily or the catalyst may drop from the coating film easily. The particulate catalyst having too small a size may agglomerate or flocculate easily and be less likely to be dispersed. The poor dispersion of the particulate catalyst may cause the coating film to have paint seeding or agglomerate. The coating film having paint seeding or agglomerate may have poor film-forming or adhesion. Such a coating film may peel easily or the catalyst particles may drop from the coating film easily. Further, the poor dispersion stability of the particulate catalyst may fail to provide intended storage stability of the paint composition. The particulate catalyst having a median diameter in a range of 1 to 20 μm is well dispersed and excellent in dispersion stability. Additionally, such a catalyst allows the coating film to have excellent film-forming and adhesion. Such a coating film is less likely to drop the catalyst and exhibits high performance to decompose ozone for a long term. Further, the particular catalyst having a median diameter in a range of 1 to 20 μm allows the paint composition to have higher storage stability. A most preferred median diameter is in a range of 3 to 18 μm, especially, 5 to 15 μm.

The "median diameter" is a size or diameter at a point where 50% (by weight or number) of the particles resides above this point and 50% (by weight or number) of the particles resides below this point in size distributions, according to "Test Powders and Test Particles" designated by Japanese Industrial Standards (JIS) Z 8901. The "median diameter" is also called 50% size, 50% diameter, or $D_{50}$. As well as the median diameter, average diameter may be often used as representation of a size. Herein, the median diameter is measured by laser diffraction/scattering analysis. Alternatively, the value of the median diameter may be disclosed in product description. The "median diameter measured by laser diffraction/scattering analysis" is a diameter ($D_{50}$) that is the midpoints or 50% position of the cumulative % distribution determined by laser diffraction/scattering analysis with a laser diffraction size analyzer. With respect to the value of the diameter, approximate value or any error in measurement is acceptable. An error of 10% or less is within an allowable range. When the size distribution is often symmetrical about the center (50% diameter), the median diameter is the same as the average diameter. From this point of view, the median diameter can be loosely equated with the average diameter. The difference between the median diameter and the average diameter may be considered to be within an error range.

Examples of the activated carbon include sawdust, wood chip, charcoal, bamboo charcoal, coal (including lignite, brown coal, and bituminous coal), petroleum such as petroleum pitch or oil carbon, walnut shell charcoal, palm shell charcoal, resin (including phenolic resin and epoxy resin), and rayon. The activated carbon preferably has a carbon content of 90%. Preferred activated carbon is derived from palm shell charcoal or petroleum pitch, or a wood, which have a high specific surface area to catch ozone. Preferred palm shell charcoal is derived from coconut palm, oil palm, or sago palm, which are high in carbon content. The activated carbon may carry an organic metal complex with cobalt or iron as a central metal.

The activated carbon such as a coconut shell charcoal preferably has a specific surface area in a range of 500 to 3000 $m^2/g$, which is determined by the BET method using nitrogen adsorbate. The activated carbon having too high a specific surface area may agglomerate or flocculate easily and be less likely to be dispersed. The poor dispersion of the activated carbon may cause a paint nozzle to be clogged with the activated carbon particles or the coating film to have paint seeding or agglomerate. The coating film with paint seeding or agglomerate may have poor film-forming or adhesion. Such a coating film may peel easily or the activated carbon particles may drop from the coating film easily. Further, the poor dispersion stability of the particulate activated carbon may fail to provide intended storage stability of the paint composition. The activated carbon having too low a specific surface area may fail to provide intended performance to decompose ozone. The activated carbon having a specific surface area in a range of 500 to 3000 $m^2/g$, which is determined by the BET method, is well dispersed and excellent in dispersion stability. Additionally, such particulate activated carbon allows the coating film to have excellent film-forming and adhesion. Such a coating film is less likely to drop the activated carbon particles and exhibits high performance to decompose ozone for a long term. Further, the particular activated carbon having a specific surface area in a range of 500 to 3000 $m^2/g$ allows the paint composition with higher storage stability. A most preferred specific surface area determined by the BET method is in a range of 600 to 2500 $m^2/g$, especially, in a range of 900 to 2000 $m^2/g$. The activated carbon has a total pore volume, for example, in a range of 0.1 to 1.5 $cm^3/g$, preferably 0.2 to 1.0 $cm^3/g$. This total pore volume is determined in accordance with nitrogen adsorption amount at relative pressure $P/P_0$ of 1.0 in nitrogen adsorption isotherm. The activated carbon has an average pore diameter (which is calculated using the formula: total pore volume/BET specific surface area×4), for example, in a range of 0.3 to 10 nm, preferably 0.5 to 5 nm, for preventing particulate matters in air from being bound to the activated carbon and providing higher performance to adsorb ozone.

The activated carbon such as a coconut shell charcoal preferably has a median diameter in a range of 1 to 20 μm. The median diameter may be comparable to an average size. The particulate activated carbon having too large a size has a low surface area and thus may fail to achieve high performance to decompose ozone. The particulate activated carbon having too large a size may cause the coating film to have poor film-forming or adhesion. Such a coating film may peel easily or the activated carbon may drop from the coating film easily. The particulate activated carbon having too small a size may agglomerate or flocculate easily and be less likely to be dispersed. The poor dispersion of the particulate activated carbon may cause the coating film to have paint seeding or agglomerate. The coating film having paint seeding or agglomerate may have poor film-forming or adhesion. Such a coating film may peel easily or the activated carbon particles may drop from the coating film easily. Further, the poor dispersion stability of the particulate activated carbon may fail to provide intended storage stability of the paint composition. The activated carbon particles having a median diameter in a range of 1 to 20 μm is well dispersed and excellent in dispersion stability. Additionally, such a particulate activated carbon allows the coating film to have excellent film-forming and adhesion. Such a coating film is less likely to drop the activated carbon particles and exhibits high performance to decompose ozone for a long term. A most preferred specific surface area is in a range of 3 to 18 μm, especially, in a range of 5 to 15 μm.

As the dispersant included in the water-based paint composition of the present embodiment, a polyacrylate-based dispersant may be employed. The polyacrylate-based dispersant may include a polyacrylate salt. Alternatively, the polyacrylate-based dispersant may have a compound with an acrylic group or a modified acrylic group. The polyacrylate-based dispersant includes a modified polyacrylate-based dispersant.

Such a polyacrylate-based dispersant prevents the agglomeration or flocculation of the manganese oxide-based catalyst and activated carbon. Thus, the polyacrylate-based dispersant enables the particulate catalyst and the particulate activated carbon to be finely and stably dispersed in the paint.

The manganese oxide-based catalyst (hereinafter, referred to as "catalyst") and the activated carbon, which have performance to decompose ozone, are provided in powder or particulate form. To prepare the paint having intended liquidity or viscosity suitable for application, the powdery or particulate catalyst and the powdery or particulate activated carbon are required to be uniformly dispersed in the paint including a resin and a solvent. Whereas, the catalyst and the activated carbon having a high specific surface area for adsorbing a large amount of ozone are easily agglomerate or flocculate. In particular, the activated carbon is more easily agglomerate or flocculate because the paint contents including organic matters such as a resin or a catalyst are held in the pores of the particulate activated carbon. A large amount of the agglomerate or flocculate of the catalyst particles and the activated carbon particles, which are poorly dispersed, may cause gelation and viscosity increase of the paint composition. Additionally, the agglomerate or flocculate may clog an applicator including a pipe and a pump. Thus, with a large amount of the agglomerate or flocculate of the catalyst particles and the activated carbon particles, the paint composition may fail to provide intended liquidity or viscosity suitable for application. Further, the paint composition may cause the coating film to have paint seeding and roughness. In this case, the coating film may be required to be thick to hind a target surface adequately. Such a coating film exhibits poor film-forming, adhesion, and appearance. Furthermore, a large amount of the agglomerate or flocculate may fail to provide intended performance to adsorb and decompose ozone. In addition, the gelation and viscosity increase caused by increased agglomeration or flocculation, which are poorly dispersed, cause the paint composition to have poor storage stability. Such a paint composition is short shelf life. To prepare the paint having intended liquidity or viscosity suitable for application, the powdery or particulate catalyst and the powdery or particulate activated carbon are required to be prevented from agglomerating or flocculating and to be well dispersed.

Thus, the polyacrylate-based dispersant enables the catalyst particles and the activated carbon particles to be stably and finely dispersed. This yields the particulate catalyst having a maximum particle diameter ($D_{max}$) of, for example, 20 μm or less and the particulate activated carbon having a maximum particle diameter of, for example, 20 μm or less. The maximum particle diameter is determined by a line transect method with a grind gauge on the basis of JISK 5600 and JISK 5400 (1990). Additionally, the catalyst and the activated carbon have 90% (by weight or number) particle size ($D_{90}$) of, for example, 10 μm or less. The cumulative 90% particle size ($D_{90}$ or 90% diameter), is determined by laser diffraction analysis with a laser diffraction particle size analyzer.

In particular, the coating film of the water-based paint composition including the catalyst and the activated carbon, which are finely dispersed using the polyacrylate-based dispersant, has less paint seeding and roughness, high film-forming and adhesion to a target base, and an even surface and good appearance. Since the coating film is less prone to have paint seeding and excellent in film-forming, the coating film with a small thickness, for example, a dry film thickness of just 5 μm or less, can cover a target surface fully.

The water-based paint composition including the catalyst and the activated carbon, which are highly dispersed by the polyacrylate-based dispersant, is to be applied to a target base and dried to give the coating film including highly dispersed catalyst particles and highly dispersed activate carbon particles. The coating film, which includes highly dispersed catalyst particles and highly dispersed activate carbon particles, allows catalyst and the activate carbon to adsorb a large amount of ozone. Such a coating film exhibits high performance to decompose ozone.

In particular, a small amount of the polyacrylate-based dispersion allows highly dispersion of the catalyst particles and the activated carbon particles. Thus, the polyacrylate-based dispersion is unlikely to inhibit ozone binding to the catalyst and the activated carbon. Thus, a small amount of the polyacrylate-based dispersion can adsorb of a large amount of ozone without inhibiting ozone binding to the catalyst and the activated carbon. Therefore, the water-based paint composition of the present embodiment allows the coating film with a small thickness, to have high performance to decompose ozone.

Furthermore, the water-based paint composition including the polyacrylate-based dispersion allows the catalyst and the activated carbon to be stably dispersed. This water-based paint composition is free from precipitate and separation resulting from agglomeration or flocculation of catalyst particles or activated carbon particles, after 1 month storage. Thus, the water-based paint composition has high storage stability.

The polyacrylate-based dispersant preferably has a weight-average molecular weight in a range of 5000 to 30000. The polyacrylate-based dispersant having a higher molecular weight has many affinity binding sites in the molecular. Thus, such a polyacrylate-based dispersant adsorbs a large amount of the particulate catalyst and the particulate activated carbon and thus prevents agglomeration or flocculation of the catalyst particles and the activated carbon particles even when the polyacrylate-based dispersant is present at low concentration. However, the polyacrylate-based dispersant having too high a molecular weight has poor compatibility with or affinity for the paint contents.

Thus, such a polyacrylate-based dispersant may fail to provide intended viscosity or liquidity suitable for application. The polyacrylate-based dispersant having too low a molecular weight has a few affinity binding sites and may fail to provide intended performance to disperse the catalyst and the activated carbon. The higher content of the polyacrylate-based dispersant can provide high performance to disperse the catalyst and the activated carbon. However, the higher content of the polyacrylate-based dispersant may fail to provide intended performance to decompose ozone because the higher content of the polyacrylate-based dispersant may cause ozone to fail to adsorb onto the catalyst and the activated carbon. The polyacrylate-based dispersant having a weight-average molecular weight in a range of 5000 to 30000 has compatibility with or high affinity for the paint contents and allows the catalyst and the activated carbon to be highly dispersed. A preferred weight-average molecular weight of the polyacrylate-based dispersant is in a range of 6000 to 28000, more preferably 7000 to 25000.

The weight average molecular (Mw) is determined by gel permeation chromatography (GPC) relative to polystyrene standard.

The polyacrylate-based dispersant preferably has an acid value in a range of 1 to 50. The polyacrylate-based dispersant having too high an acid value may fail to provide an intended adsorption property, depending on the polarity of the paint content such as an additive including a pigment. The polyacrylate-based dispersant preferably has a hydrogen-ion exponent in a range of pH4 to pH9. The hydrogen-ion exponent of the polyacrylate-based dispersant less or more than these values may provide poor dispersion of the paint contents, depending on an additive such as a pigment. The polyacrylate-based dispersant having a hydrogen-ion exponent in a range of pH4 to pH9 provides intended dispersion stably regardless of the paint contents. A preferred acid value is in a range of 3 to 48, more preferably 5 to 45. A preferred hydrogen-ion exponent is in a range of pH4.5 to pH9, more preferably pH5 to pH9.

The acid value is determined according to acid-base titration method on the basis of JISK 0070. The hydrogen-ion exponent of the polyacrylate-based dispersant is based on the emulsion, dispersion, or aqueous solution in which the polyacrylate-based dispersant is present at a concentration of 1 to 99 wt % at 25° C.

As the polyacrylate-based dispersant, commercial products, for example, DESPERBYK from BYK-Chemie, EFKA from Ciba Specialty Chemicals or EFKA ADDITIVES B.V., DISPARLON of Kusumoto Chemicals, Ltd., or SN-thickener from SANNOPKO may be employed.

Such a polyacrylate-based dispersant allows the catalyst and the activated carbon to be stably dispersed. This may be because the polyacrylate-based dispersant may attract the catalyst and the activated carbon through electric repulsion. This dispersant attraction may prevent the agglomeration or flocculation of the catalyst particles and enables the activated carbon and the catalyst to have a fine particle size. Alternatively or additionally, steric effects of anchor or polymer chain of the polyacrylate-based dispersant may prevent the agglomeration or flocculation of the catalyst particles and the activated carbon particles and enables the activated carbon and the catalyst to have a fine particle size. In particular, the polyacrylate-based dispersant has a high molecular weight and has many affinity binding sites. Thus, even a small amount of the polyacrylate-based dispersant provides intended performance to bind the catalyst and the activated carbon and enables the catalyst and the activated carbon to be well dispersed. A large amount of the polyacrylate-based dispersant is not required to highly disperse the catalyst and the activated carbon. Thus, the polyacrylate-based dispersant is unlikely to inhibit ozone binding to the catalyst and the activated carbon.

In implementing the invention, any dispersion may be used, so long as the dispersion enables the catalyst and the activate carbon to be highly dispersed. The content of the dispersant is preferably in a range of 1.5 to 75 parts by mass, more preferably 2 to 60 parts by mass, more preferably 2.5 to 50 parts, per 100 parts by mass of the total content of the manganese oxide-based catalyst and the activated carbon. This content enables the combination of high storage stability and high performance to decompose ozone.

The pH adjuster may be any material which can neutralize or adjust the paint composition to allow the paint composition to have a predetermined hydrogen-ion exponent, for example, pH 7-12 in a paint preparation step. Examples of the pH adjuster include ammonia, dimethylaminoethanol, and low-boiling-point amine such as triethylamine (TEA). The neutralization of the pH adjuster prevents decrease in a paint viscosity and settling of the manganese oxide-based catalyst and the activated carbon. This allows the paint composition to keep the high dispersion of the manganese oxide-based catalyst and the activated carbon and to have intended fluidity suitable for application.

The water-based solvent including water as the main component thereof should not be limited to 100 mass % of water. It is only required that the water-based solvent includes more than 50 mass % of water, preferably 75 mass % or more of water, more preferably 90 mass % or more of water, further preferably 95 mass % or more of water. The water-based solvent may include less organic solvent. As the water, ion-exchanged water or deionized water may be employed.

The water-soluble resin included in the water-based paint composition of the present embodiment is selected from the group consisting of the acrylic resin, the modified acrylic resin, and the fluorocarbon resin.

The acrylic resin preferably has a glass transition temperature $T_g$ of −30 to 130° C., more preferably −25 to 120° C., further preferably −25 to 90° C., particularly preferably −25 to 70° C.

The glass transition temperature $T_g$ is determined by differential scanning calorimetry (DSC).

The acrylic resin including methacrylic resin is construed broadly throughout this description to mean any acrylic polymer. The acrylic resin, which is derived from acrylic acid or methacrylic acid, may be (meth)acrylate ester homopolymer, or (meth)acrylate ester copolymer. Examples of the (meth)acrylate ester include the methyl (meth)acrylate, ethyl (meth)acrylate, propyl (meth)acrylate, isopropyl (meth)acrylate, n-butyl (meth)acrylate, isobutyl (meth)acrylate, pentyl (meth)acrylate, hexyl (meth)acrylate, ethyl hexyl (meth)acrylate, 2-hydroxyethyl (meth)acrylate, hydroxypropyl (meth)acrylate, 3-hydroxybutyl (meth)acrylate, 2,2-bis (hydroxymethyl)ethyl (meth)acrylate, 3-chloro-2-hydroxypropyl (meth)acrylate, glycidyl (meth)acrylate, aminoethyl (meth)acrylate, aminopropyl (meth)acrylate, (dimethylamino)ethyl (meth)acrylate, (diethylamino)ethyl (meth)acrylate, methoxyethyl (meth)acrylate, methoxypropyl (meth) acrylate, methoxybutyl (meth)acrylate, and stearyl (meth) acrylate.

The monomer that can be copolymerized with the (meth) acrylic acid preferably has an ethylenically unsaturated group. Examples of the monomer include ethylene, propylene, butylene, butadiene, styrene, α-methylstyrene, vinylphenol, vinyl chloride, vinylidene chloride, vinyl acetate, vinyl pivalate, vinyl benzoate, vinyl alcohol, allyl alcohol, crotonic acid, itaconic acid, maleic acid, fumaric acid, (meth) acrylamide, N-methylolacrylamide, N-(butoxymethyl) (meth) acrylamide, and (meth) acrylonitrile. Typical example of the copolymerization includes, but not exclusively, emulsion polymerization. The acid above may be acid alkali metal salt or acid alkali earth metal salt.

The modified acrylic resin is a (meth) acrylic resin ester homopolymer or copolymer modified with urethane resin, epoxy resin, phenol resin, or melamine resin: urethane modified (meth) acrylic resin, epoxy modified (meth) acrylic resin, phenol modified (meth) acrylic resin, or melamine modified (meth) acrylic resin. The modified acrylic resin preferably has more than 50 mass % of acrylic resin unit and less than 50 mass % of modifying resin unit.

The modified acrylic resin preferably has a glass transition temperature $T_g$ of −30 to 130° C., more preferably −25 to 110° C., further preferably −25 to 80° C., particularly preferably −20 to 70° C.

Examples of the fluorocarbon resin include polytetrafluoroethylene (PTFE), perfluoro alkoxy alkane (PFA), perfluoro ethylene propylene copolymer (FEP), tetrafluoroethylene hexafluoropropylene, copolymerethylene-tetrafluoroethylene, polyvinylidene fluoride, polychlorotrifluoroethylene, and chlorotrifluoroethylene ethylene.

The fluorocarbon resin preferably has a glass transition temperature $T_g$ of −30 to 100° C., more preferably −25 to 90° C., further preferably −25 to 80° C., particularly preferably −20 to 50° C.

The water-soluble resin selected from the group consisting of acrylic resin, the modified acrylic resin, and the fluorocarbon resin preferably has a median diameter in a range of 50 to 150 nm. The median diameter may be comparable to an average particle size. Such resins are well dispersed in water and allows the coating film to have advantageous film-forming and evenness, and adhesion to a metal target base. More preferably, the resins have a median diameter in a range of 60 to 140 nm, further preferably 70 to 130 nm.

The water-soluble rein emulsion, dispersion, or aqueous solution that includes a 1 to 99 wt % water-soluble resin is preferably alkalescent; that is, preferably, it has hydrogen-ion exponent in a range of pH7 to pH9. Such a water-soluble resin is well dispersed in water and allows the coating film having advantageous film-forming and evenness, high density, and adhesion to a metal target base.

An aqueous solution, an emulsion, a dispersion, a water-soluble vanish, a water-based sol-gel in which the water-soluble resin selected from the group consisting of the acrylic resin, the modified acrylic resin, and the fluorocarbon resin is dissolved or dispersed in a water-based solvent is used. The term "emulsion" inherently means liquids including colloidal particles or larger particles than colloidal particles are dispersed in liquids. This is referred to clause 152 of Iwanami Physics and Chemistry Dictionary, the fifth edition edit by Saburo Nagakura, published by Iwanami Shoten Publishing Ltd., at 20 Feb. 1998. However, herein, the term "emulsion" has broad meaning; that is, it means both liquid particles are dispersed in liquids and solids particles are suspended in liquids.

In implementing the invention, the water-based paint composition may include a pigment or an additive depending on use applications such as for rust prevention and for chipping resistance. Examples of the pigments include color pigments, extender pigments, rust preventive pigments, and functional pigments. The additive may be added to improve application properties or coating film performance.

Examples of the color pigments include carbon black, titanium oxide, iron oxidize, zinc oxide, azo-type organic pigments, insoluble azo-type pigments, condensed azo, diketo-pyrrolo-pyrrole, benzimidazolon, phthalocyanine, indigo pigments, perinone, perylene, dioxane, quinacridone, isoindolinone, metal complex, chrome yellow, zinc iron oxide, red iron oxide, and titanium dioxide.

Examples of the rust preventive pigments include a zinc phosphate, zinc phosphite, aluminium polyphosphate, aluminium tripolyphosphate, calcium molybdate, zinc orthophosphate, zinc polyphosphate, zinc molybdate, zinc phosphosilicate, aluminium phosphomolybdate, zinc oxide, zinc silicate, aluminium phosphate, calcium phosphate, zinc cyanamide, calcium cyanamide, barium metaborate, and magnesium aminophosphate. The rust preventive pigments that do not include toxic heavy metals such as chromiums are preferable from the viewpoint of environmental protection.

The content of the rust preventive pigments is preferably less than 30 mass %, more preferably less than 20 mass % in the coating film. Such a content allows the paint composition to exhibit good storage stability.

Examples of the extender pigments include talc, calcium carbonate, barium sulfate, calcium sulfate, mica, kaolinite, silica, diatomite, alumina, baryta, and silicon dioxide. In particular, talc allows the coating film to have layer structures with a high density and to prevent contamination of corrosion factors.

Examples of the additives include viscosity modifiers, film-forming agents, dispersants for dispersing pigments, defoamers, fillers, plasticizers, anti-sagging agents, film-forming aids, thixotropic agents, leveling agents, pH adjusters, neutralizers, ultraviolet absorbents, ultraviolet stabilizers, anti-settling agents, tackifiers, curing catalysts, desiccants, stabilizers, and surface additives.

As the dispersants for dispersing pigments, polycarboxylic acid-based dispersants may be employed.

Examples of the defoamers include silicone-based defoamers and acrylic-based defoamers. The defoamers prevent and destroy fine foam bubbles in a mixing process and enable the paint composition to have intended homogenization and viscosity or fluidity. Additionally, the paint composition with few foam bubbles is less likely to cause rust resulting from moisture contamination from bubbles and thus exhibits high performance to prevent rust.

Examples of the desiccants include metal-based desiccants such as cobalt naphthenate and lead naphthenate. The desiccants facilitate drying in a coating film-forming process and thus allow the coating film to have increased polymerization of the water-soluble resin and increased density.

Examples of the stabilizers include alkanolamine derivatives such as diisopropanolamine, ethanolamine, diethanolamine, diethanolamine, triisopropanolamine, and triethanolamine. The stabilizers enable adjustment of fluidity, viscosity, or dispersion and stabilization of the paint composition. The alkanolamine derivatives may action as corrosion inhibitors for initial rust.

An example of the method of manufacturing the water-based paint composition, including the manganese oxide-based catalyst, the activated carbon, the dispersant, at least one water-soluble resin selected from the group consisting of the acrylic resin, the modified acrylic resin, and the fluorocarbon resin, the pH adjuster, and the solvent including the water as a principal component thereof, according to the embodiment of the present invention will now be described.

In a dispersing step, the water-based solvent, the manganese oxide-based catalyst, the activated carbon, and the dispersant are mixed or dispersed using a disperser.

In a neutralization step, the resulting mixture, which the manganese oxide-based catalyst, the activated carbon and the dispersant is dispersed in the water-based to give, is then mixed with a pH adjuster or a neutralizer.

In a paint prepare final step, the resulting neutralized mixture is mixed with the at least water-soluble resin selected from the group consisting the acrylic resin, the modified acrylic resin, and the fluorocarbon resin and then stirred with, for example, a disperser.

This yields the water-based paint composition including the manganese oxide-based catalyst, the activated carbon, the dispersant, the at least one water-soluble resin, the pH adjuster, and the water as the solvent.

As the mixing or dispersing or stirring machine used in the dispersion step or the paint prepare final step, for example, a ball mill, bead mill, high pressure injector, dissolver, banbury mixer, planetary mixer, butterfly mixer, spiral mixer, roll mill, sand mill, paint shaker, glen mill, high speed impeller mill, open kneader, vacuum kneader, attritor, high speed disperser, homo mixer, homogenizer, colloid mill, microfluidizer, sonolator, and cavitron may be employed. Among these, the bead mill or roll mill are preferred. The bead mill and roll mill allow the manganese oxide-based catalyst and the activated carbon to be finely dispersed so that the particles of the catalyst and the activated carbon have a predetermined size. The pigment may be added in the dispersion step.

In the neutralization step, the pH adjuster is added to the mixture including the manganese oxide-based catalyst, the activated carbon, the water, and the dispersant. Through the neutralization, the pH of the mixture is adjusted to in a range of pH7 to pH12, preferably pH8 to pH11.5, more preferably pH9.5 to pH11. This prevents decrease of the paint viscosity and settling of the paint contents, allows the paint contents to be uniformly and stably dispersed. This enables the paint composition to have good application properties and the coating film to be uniform.

In the paint prepare final step, the neutralized mixture is mixed with the at least water-soluble resin selected from the group consisting of the acrylic resin, the modified acrylic resin, and the fluorocarbon resin and then stirred with the disperser. The additive may be added in the paint prepare final step.

However, the above method manufacturing the water-based paint composition is not intended to limit the present invention.

The water-based paint composition is to be applied to a target base in known painting way, for example, air spray, shower, spray, roll coater, flow coater, die coater, brush, immersion, drawing or ironing, knife coater, bar coating, and electrostatic coating. The coating amount, the thickness, and application conditions of the paint are freely selected. The water-based paint composition applied to the target base is air-dried or dried in an oven to evaporate or vaporize the solvent including water therein. Alternatively, it may be heat-dried at a predetermined temperature for a predetermined time or be force-dried using a dryer. Thus, the paint composition is dry-hardened. This yields the hardened coating film formed on the target bases.

The water-based paint composition of the present embodiment may be to be directly applied to desired sites such as radiators and funs and then dried to give the hardened coating film formed on the application site. Alternatively, the water-based paint composition may be to be applied to a base such as sheets, for example, a wrapping sheet made from polyvinyl chloride and then dried to give the hardened coating film formed on the sheet. The sheet with the hardened coating film is stuck onto desired sites, for example, vehicle parts, such as roofs and interiors to give the hardened coating film formed on the desired sites. Such a sheet with the hardened coating film, which is obtained by applying the water-based paint composition to a sheet and then drying it, is to be applied to any sites without using an applicator and a dryer and save application cost.

The water-based paint composition including the manganese oxide-based catalyst, the activated carbon, the dispersant, at least one water-soluble resin selected from the group consisting of the acrylic resin, the modified acrylic resin, and the fluorocarbon resin, a pH adjuster, and the water-based solvent is to be applied to the surface of the target base and dried to give the hardened coating film formed on the target base. This coating film, which includes the manganese oxide-based catalyst and the activated carbon, exhibits ozone decomposition performance.

The manganese oxide-based catalyst can decompose ozone thereon into harmless substance(s). Specifically, the manganese oxide-based catalyst adsorbs ozone thereon and decreases self-decomposition reaction activation energy of the ozone. This results in ozone decomposition. The decomposed results are desorbed from the manganese oxide-based catalyst. Thus, the ozone is decomposed into oxygen through the catalysis of the manganese oxide-based catalyst.

The activated carbon having pores can catch ozone. The ozone adsorbed on the activated carbon pores reacts with the activated carbon or receives electrons from the activated carbon. That is, the activated carbon adsorbs ozone and decreases self-decomposition reaction activation energy of the ozone. This causes the ozone to be decomposed into carbon monoxide, carbon dioxide, reactive oxygen species, or oxygen. Thus, the ozone is decomposed into harmless substance(s). The activated carbon exhibits higher activity in a wide range of temperatures including room temperature (15° C. to 25° C.) and in a wide range of humidity, while the manganese oxide-based catalyst exhibits higher activity at high temperatures, for example, about 80° C.

The water-based paint composition of the present embodiment includes both the manganese oxide-based catalyst and the activated carbon. Such a water-based paint composition has higher performance to decompose ozone compared to a composition including one of the manganese oxide-based catalyst or the activated carbon. This may be because the heat of reaction between the activated carbon and the ozone may increase the catalytic activity of the manganese oxide-based catalyst. Alternatively or additionally, the reason may be that combination use of the manganese oxide-based catalyst and the activated carbon allow ozone decomposition over a wider range of temperatures. Alternatively, the reason may be that the manganese oxide-based catalyst particles are held in the pores of the activated carbon particles and thus increase the frequency of contact with the ozone. Further, the reason may be that the manganese oxide-based catalyst prevents oxidation or degradation of the activated carbon, which is exposed to reactive oxygen species. For such reasons, the water-based paint composition including both the manganese oxide-based catalyst and the activated carbon has higher performance to decompose ozone compared to a composition including one of the manganese oxide-based catalyst or the activated carbon.

The water-based paint composition is required to have long term storage or storage stability for practical use. Here, the use of only the activated carbon for decomposing ozone fails to provide intended storage stability. This is because the activated carbon, which has adsorption properties, adsorbs organic matters such as resins includes in the paint composition and thus results in agglomeration or flocculation of the activated carbon particles. Thus, the water-based paint composition of the present embodiment includes both the activated carbon and the manganese oxide-based catalyst for decomposing ozone. This combination enables the paint composition to have high storage stability and the coating film to exhibit both high performance to decompose ozone. Additionally, the combination enables the paint composition to have a longer shelf life than if a paint composition uses only the activated carbon.

A paint composition uses only the manganese oxide-based catalyst is expensive. Whereas, the paint composition using both the manganese oxide-based catalyst and the activated carbon, which is available at low cost, is inexpensive.

The water-based paint composition including the manganese oxide-based catalyst and the activated carbon is to be applied to the base and then dried to give the hardened coating film. This hardened coating film, which includes the manganese oxide-based catalyst and the activated carbon, enables ozone, which is in air and being in contact with the hardened coating film, to be decomposed. This results in air purification.

In particular, the water-based paint composition of the present embodiment includes the at least one water-soluble resin selected from the group consisting of the acrylic resin, the modified acrylic resin, and the fluorocarbon resin, which binds the manganese oxide-based catalyst and the activated carbon as a binder connecting the manganese oxide-based catalyst and the activated carbon. Thus, the coating film of water-based paint composition is less prone to chalking and has high weather resistance even if the coating film is exposed to light.

The water-based paint composition of the present embodiment will be further specifically described with reference to examples. The formulation of each example of the water-based paint composition is shown in Table 1. The formulation of each comparative example is also show in Table 1.

TABLE 1

| | | | Example 1-1 | Example 1-2 | Example 2-1 | Example 2-2 | Example 3-1 | Example 3-2 | Comparative Example 1-1 |
|---|---|---|---|---|---|---|---|---|---|
| Dispersion step | | Activated carbon | 3.2 | 2.2 | 3.2 | 2.2 | 3.2 | 2.2 | 3.2 |
| | | Manganese oxide-based catalyst | 7.2 | 5.1 | 7.2 | 5.1 | 7.2 | 5.1 | 7.2 |
| | | Dispersant(Polyacrylate-based) | 0.5 | 0.4 | 0.5 | 0.4 | 0.5 | 0.4 | 0.5 |
| | | Water | 69.1 | 48.7 | 62.5 | 27.9 | 70 | 50.9 | 62.5 |
| Neutralization step | | Triethylamine (TEA) | 1.5 | 1.5 | 1.5 | 1.5 | 1.5 | 1.5 | 1.5 |
| Paint final prepare step | Water-soluble resin emulsion | Acrylic resin A (Solid content: 47%) | 12(5.64) | 36.7(17.25) | | | | | |
| | | Modified acrylic resin A (Solid content: 30%) | | | 18.6(5.58) | 57.5(17.25) | | | |
| | | Fluorocarbon resin A (Solid content: 50%) | | | | | 11.1(5.55) | 34.5(17.25) | |
| | | Polypropylene resin A (Solid content: 30%) | | | | | | | 18.6(5.58) |
| | | Polypropylene resin B (Solid content: 30%) | | | | | | | |
| | | Epoxy resin (Solid content: 47%) | | | | | | | |
| | | Urethane resin (Solid content: 47%) | | | | | | | |
| | | Additive | 6.5 | 5.4 | 6.5 | 5.4 | 6.5 | 5.4 | 6.5 |
| Total (Unit: parts by mass) | | | 100 | 100 | 100 | 100 | 100 | 100 | 100 |
| Total concentration of activated carbon and manganese oxide-based catalyst*1 | | | 65% | 30% | 65% | 30% | 65% | 30% | 65% |
| Ozone decomposition performance | | | Excellent | Good | Excellent | Good | Excellent | Good | Excellent |
| Weather resistance | | | Good | Excellent | Good | Excellent | Good | Excellent | Poor |
| Total evaluation | | | Good | Good | Good | Good | Good | Good | Poor |

| | | | Comparative Example 1-2 | Comparative Example 1-3 | Comparative Example 2-1 | Comparative Example 2-2 | Comparative Example 3-1 | Comparative Example 3-2 |
|---|---|---|---|---|---|---|---|---|
| Dispersion step | | Activated carbon | 2.2 | 2.2 | 3.2 | 2.2 | 3.2 | 2.2 |
| | | Manganese oxide-based catalyst | 5.1 | 5.1 | 7.2 | 5.1 | 7.2 | 5.1 |
| | | Dispersant(Polyacrylate-based) | 0.4 | 0.4 | 0.5 | 0.4 | 0.5 | 0.4 |
| | | Water | 27.9 | 27.9 | 69.2 | 48.7 | 69.2 | 48.7 |
| Neutralization step | | Triethylamine (TEA) | 1.5 | 1.5 | 1.5 | 1.5 | 1.5 | 1.5 |
| Paint final prepare step | Water-soluble resin emulsion | Acrylic resin A (Solid content: 47%) | | | | | | |
| | | Modified acrylic resin A (Solid content: 30%) | | | | | | |
| | | Fluorocarbon resin A (Solid content: 50%) | | | | | | |

TABLE 1-continued

| | | | | | | |
|---|---|---|---|---|---|---|
| Polypropylene resin A (Solid content: 30%) | 57.5(17.25) | | | | | |
| Polypropylene resin B (Solid content: 30%) | | 57.5(17.25) | | | | |
| Epoxy resin (Solid content: 47%) | | | 11.9(5.59) | 36.7(17.25) | | |
| Urethane resin (Solid content: 47%) | | | | | 11.9(5.59) | 36.7(17.25) |
| Additive | 5.4 | 5.4 | 6.5 | 5.4 | 6.5 | 5.4 |
| Total (Unit: parts by mass) | 100 | 100 | 100 | 100 | 100 | 100 |
| Total concentration of activated carbon and manganese oxide-based catalyst*[1] | 30% | 30% | 65% | 30% | 65% | 30% |
| Ozone decomposition performance | Good | Good | Excellent | Good | Excellent | Good |
| Weather resistance | Poor | Poor | Poor | Poor | Poor | Poor |
| Total evaluation | Poor | Poor | Poor | Poor | Poor | Poor |

*[1]Total concentration of activated carbon and manganese oxide-based catalyst (%) = (Activated carbon mass + Manganese oxide-based catalyst mass)/(Resin mass + Activated carbon mass + Manganese oxide-based catalyst mass) × 100

As shown in Table 1, the water-based painting composition according to the examples included activated carbon (raw material; palm shell, average particle size; 5 μm, BET specific surface area; 2000 $m^2/g$), a manganese dioxide-based catalyst (manganese dioxide content: 70 wt % or more, average particle size: 5 μm, BET specific surface area: 250 $m^2/g$), a polyacrylate-based dispersant, water as a solvent, triethylamine (TEA) as a pH adjuster or neutralizer, a water-soluble resin, and additive including a viscosity modifier or a thickener. As the water-soluble resin, any one of an acrylic resin A (resin solid content: 47 wt %, minimum film-forming temperature (MFT): 40° C., glass-transition temperature $T_g$: 70° C.), a modified acrylic resin A (resin solid content: 30 wt %, minimum film-forming temperature (MFT): 20° C., glass-transition temperature $T_g$: 70° C.), or a fluorocarbon resin A (resin solid content: 50 wt %, minimum film-forming temperature (MFT): 50° C., glass-transition temperature $T_g$: 50° C.) was used.

In Table 1, the activated carbon means solid content of 100% and the manganese dioxide-based catalyst means solid content of 100%. The water as a solvent is deionized water. The unit of values of the materials shown in Table 1 is parts by mass.

A method of producing the water-based painting composition according to the examples 1 to 3 is now described. In a dispersing step, the activated carbon, the manganese dioxide-based catalyst (hereinafter, referred to as "catalyst"), the water as a solvent, and the polyacrylate-based dispersant were mixed according to each formulation shown in Table 1 and were dispersed for 90 minutes at 1500 rpm using a bead mill.

The bead mill was a zirconia bead mill having the zircon media with 1.5 mm in diameter.

In a neutralization step, the dispersed mixture was then neutralized by adding the triethylamine (TEA) as a pH adjuster to the dispersed mixture according to the formulations shown in Table 1. In the paint prepare final step in which the materials are mixed or dispersed, the neutralized mixture was mixed with the emulsion of any one of the acrylic resin A, the modified acrylic resin A, or the fluorocarbon polymer A and the additive including a viscosity modifier or a thickener according to the formulations shown in Table 1 and then stirred using a disperser for 5 to 10 minutes. These steps yielded the water-based paint composition according to the examples.

The water-based paint composition of each example included the activated carbon having a maximum particle diameter ($D_{max}$) of 20 μm or less and cumulative 90% particle size ($D_{90}$) of 10 μm or less and the manganese dioxide-based catalyst having a maximum particle diameter ($D_{max}$) of 20 μm or less and cumulative 90% particle size ($D_{90}$) of 10 μm or less. It is noted that the maximum particle diameter was determined by a line transect method with a grind gauge on the basis of JISK 5600 and JISK 5400 (1990). It is also noted that the cumulative 90% particle size ($D_{90}$) was determined by laser diffraction analysis with a laser diffraction particle size analyzer.

The comparative examples shown in Table 1 employed different resins from the examples. That is, the comparative examples employed a polypropylene resin A (resin solid content: 30 wt %, minimum film-forming temperature (MFT): 40° C., glass-transition temperature $T_g$: 30° C.), a polypropylene resin B (resin solid content: 30 wt %, minimum film-forming temperature (MFT): 60° C., glass-transition temperature $T_g$: 50° C.), an epoxy resin (resin solid content: 47 wt %, minimum film-forming temperature (MFT): 50° C., glass-transition temperature $T_g$: 60° C.), and an urethane resin (resin solid content: 47 wt %, minimum film-forming temperature (MFT): 10° C., glass-transition temperature $T_g$: 10° C.). The comparative examples employed the same materials as the examples except for the resins and were prepared in a similar manner as the examples.

The water-based paint composition of each example and each comparative example, which was prepared according to each formulation shown in Table 1, was applied to a base and then dried to give a hardened coating film. The hardened coating film were tested and assessed to ozone decomposition performance and weather resistance.

In the ozone decomposition test, the water-based paint composition was applied to a polypropylene base 20 (hereinafter, referred to as "resin base 20"), and then dried at 100° C. for 10 min to give a test specimen T having a hardened coating film 1 (with about 150 mm×70 mm×10-20 μm in dimensions) formed on the resin base 20 (with about 150 mm×70 mm×3 mm in dimensions), as shown in FIG. 1. This test specimen t, which has the resin base 20 coated with the hardened coating film 1 made from the water-based paint composition, was used for the ozone decomposition test. It is noted that the hardened coating film 1 was covered over the surface of the resin base 20.

As shown in FIG. 1, the test specimen t was put in a tedlar (Registered Trade Mark) bag 10 with a volume of 10 L and the bag 10 containing the test specimen t was sealed. The sealed bag 10 enclosed air, which has been put in the bag 10 through a sleeve S using air pump or air blow, and ozone created by an ozone generator. The bag 10 had 2.0 ppm ozone entrapped.

After two hours, the concentration of ozone enclosed in the bag 20 was measured. The ozone decomposition ratio was calculated using initial concentration value and measured concentration value. It is noted that this test was performed at room temperature 25° C.

The example(s) that provided the ozone decomposition ratio of 24% or more is determined to have good performance to decompose ozone. The example(s) that provided the ozone decomposition ratio of 90% and more is determined to have an excellent performance to decompose ozone. The example(s) that provided the ozone decomposition ratio of 80% and more and less than 90% is determined to have a fair performance to decompose ozone. The example(s) that provided the ozone decomposition ratio of less than 80% is determined to have a poor performance to decompose ozone.

In the weather resistance test, the water-based paint composition was applied to a metal base made of stainless steel or aluminum and then dried at 100° C. for 10 min to give a test specimen having a hardened coating film (with about 150 mm×70 mm×10-20 μm in dimensions) formed on the metal base (with about 150 mm×70 mm×1 mm in dimensions). This test specimen, which is the metal base coated with the hardened coating film made from the water-based paint composition, was used for the weather resistance test.

Specifically, the weather resistance test was performed according to accelerated weather test on the basis of a super xenon method. In the method, the test specimen was irradiated with xenon lamps (intensity: 180 W/$m^2$, wavelength 300 to 400 nm, accumulated intensity: 250 MJ/$m^2$) using a super xenon weather meter (Suga test Instruments Co, Ltd). When the accumulated intensity was reached to 250 MJ/$m^2$, the coated surface of the metal base of the test specimen was pressed with a cloth. To evaluate chalking as a measure of the weather resistance, powder adhered to the cloth was determined. The powder adhesion with the cloth was evaluated on four scales. The example(s) that gave the cloth with no or less powder is determined to be excellent. The example(s) that gave the cloth with a less powder is determined to be good. The example(s) that gave the cloth with powder is determined to be fair. The example(s) that gave the cloth with much powder is determined to have less resistant to weather and no practical use and thus is determined to be poor.

The example(s) that is excellent, good, or fair in the ozone decomposition test and in the weather resistance test is determined to be great in a total evaluation. The example that is poor in the ozone decomposition test or/and in the weather resistance test is determined to be poor in the total evaluation. The test result is shown in the lower column of Table 1.

As shown in the lower column of Table 1, the examples, employing any one of the acrylic resin, the modified acrylic resin, or the fluorocarbon resin as the water-soluble resin, exhibit ozone decomposition ratio of 80% and are evaluated to be excellent or good in the ozone decomposition test. Further, the examples, employing any one of the acrylic resin, the modified acrylic resin, or the fluorocarbon resin as the water-soluble resin, exhibit high weather resistance and are evaluated to be excellent or good chalking resistance in the weather resistance test.

The comparative examples, employing any one of the polypropylene resin, the epoxy resin, or the urethane resin as the water-based resin, are evaluated to be excellent or good in the ozone decomposition test, however, are evaluated to be poor in the weather resistance test and exhibit poor chalking resistance, which means poor weather resistance. In particular, the comparative examples exhibited chalking when the accumulated intensity was reached to 25 MJ/$m^2$.

The hardened coating film of each of the comparative examples is made from water-based paint composition including any one of the polypropylene resin, the epoxy resin, or the urethane resin, which are typically used in paint of vehicle parts such as automobile parts. This hardened coating film of each of the comparative examples includes the manganese oxide-based catalyst. Therefore, the resin decomposition is accelerated by photocatalysis of the manganese oxide-based catalyst under light irradiation. This causes the hardened coating film to have chalking. Thus, the hardened coating film of each of the comparative example is poor resistant to weather. Whereas, the hardened coating film of each of the examples, which is made from the water-based paint composition including any one of the acrylic resin, the modified acrylic resin, or the fluorocarbon resin, are prevented from resin degrading and less likely to have chalking and exhibit excellent weather resistance.

This may be because the acrylic resin, the modified acrylic resin, and the fluorocarbon resin have C—F bonding with high bonding energy or O—H bonding with high bonding energy and high bonding energy between atoms or molecules of monomers of polymers. For this reason, the bonding in polymer chains may be hardly cut and the resin (organic matter) may be hardly degraded or decomposed even by ultraviolet rays and the photocatalysis of the manganese oxide-based catalyst. The manganese oxide-based catalyst included in the coating film can absorb light energy to reach a high level of energy state and create reactive oxygen species such as hydroxyl radical (OH radical), superoxide anion, and hydroperoxyl radical (peroxide). Such reactive oxygen species may cut the molecular bonding energy of the resin to decompose or degrade the resin. However, the acrylic resin, the modified acrylic resin, and the fluorocarbon resin have high energy of the bonding between the molecules or the atoms. Therefore, the acrylic resin, the modified acrylic resin, and the fluorocarbon resin are less prone to be decomposed or degraded.

It is noted that the reactive oxygen species including hydroxyl radical generated by the photocatalysis of the manganese oxide-based catalyst may have larger energy than ultraviolet A and ultraviolet B rays with short wavelength of about 300 to 400 nm. The resin degradation process caused by the photocatalysis of the manganese oxide-based catalyst is different from the light oxidation degradation process with ultraviolet ray excitation.

The acrylic resin, the modified acrylic resin, and the fluorocarbon resin, which are less hygroscopic or have low water absorption characteristics, may less prone to hydrolysis of a first bonding or a second bonding, may hardly accelerate the light oxidation catalysis reaction of the manganese dioxide-based catalyst, and may enable prevention of oxygen from reaching to the inner of the coating film. This may relate to the high weather resistance of the examples.

The manganese oxide-based catalyst absorbs the light to create hydroperoxyl radical generated by interaction between oxygen and water. The acrylic resin, the modified acrylic resin, and the fluorocarbon resin, which are less hygroscopic or have low water absorption characteristics, allow the coating film to be less moisture-permeable and enable the prevention of oxygen from reaching into the inner of the coating film. This enables the prevention of coating film degradation caused by the light oxidation catalysis reaction of the manganese dioxide-based catalyst. The acrylic resin, the modified acrylic resin, and the fluorocarbon resin, which are less hygroscopic or have low water absorption characteristics, may hardly accelerate autoxidation caused by light and oxygen.

The acrylic resin, the modified acrylic resin, and the fluorocarbon resin are compatible with the manganese dioxide-based catalyst and have wettability. Alternatively, the acrylic resin, the modified acrylic resin, and the fluorocarbon resin may have low surface energy and may enable the coating film to less moisture or water permeable. This may prevent the acceleration of light oxidation caused by water molecules and the acceleration of light oxidation catalysis reaction of the manganese oxide-based catalyst.

The acrylic resin, the modified acrylic resin, and the fluorocarbon resin have a polymer main chain having at least one of C—F bonding, O—H bonding, C═O bonding, or C═C bonding with large bonding energy. This may allow the manganese dioxide-based catalyst to fail to create hydroxyl radical (OH radical). The above bonding may protect C—C bonding or C—H bonding three-dimensionally or electrically. This may enable the C—C bonding or C—H bonding to be hardly degraded. The acrylic resin, the modified acrylic resin, and the fluorocarbon resin have high uniformity of regular structures and thus may be hardly decomposed.

The acrylic resin, the modified acrylic resin, and the fluorocarbon resin are less likely to rise in temperature. This may prevent the molecules of such resins from cutting caused by heating and from bonding with oxygen. Thus, such resins may be prevented from degrading or decomposing.

The acrylic resin, the modified acrylic resin, and the fluorocarbon resin to be available, typically, has few residual impurities, such as polymerization catalysts used in polymerization for making polymers and additives used for terminating polymerization. Thus, such resins may be less prone to degradation due to the residual impurities.

In the hardened film that includes the manganese oxide-based catalyst and the activated carbon and thus has the performance to decompose ozone, oxygen generated by ozone decomposition may be likely to cause the light oxidation degradation of the resin. $H_2O$ generated by organic matter decomposition caused by photocatalyst may accelerate decomposition of the resin bonding. The binder using at least one of the acrylic resin, the modified acrylic resin, or the fluorocarbon resin allows the decomposition and degradation of the resin to be prevented. Therefore, the coating film, which includes at least one of the acrylic resin, the modified acrylic resin, or the fluorocarbon resin, is less prone to chalking and highly resistant to weather.

Further, the water-based paint compositions were made using different resins including the acrylic resin, the modified acrylic resin, and the fluorocarbon resin. These water-based paint compositions were also evaluated in regard to the ozone composition performance and the weather resistance in the same way as described above.

That is, the water-based paint compositions were made using different resins and different total concentrations of the manganese dioxide-based catalyst and the activated carbon. Such water-based paint compositions will be further specifically described with reference to examples. The formulation of each example of the water-based paint composition is shown in Table 2. The examples 1-1 and 1-2 in Table 2 is the same as the examples 1-1 and 1-2 in Table 1. The examples 1-3 to 1-11 was made as described above.

TABLE 2

| | | | Example 1-1 | Example 1-2 | Example 1-3 | Example 1-4 | Example 1-5 |
|---|---|---|---|---|---|---|---|
| Dispersion step | Activated carbon | | 3.2 | 2.2 | 3.6 | 2.6 | 2.3 |
| | Manganese oxide-based catalyst | | 7.2 | 5.1 | 8.0 | 5.9 | 5.3 |
| | Dispersant(Polyacrylate-based) | | 0.5 | 0.4 | 0.5 | 0.4 | 0.4 |
| | Water | | 69.1 | 48.7 | 71.5 | 61.6 | 54.9 |
| Neutralization step | Triethylamine (TEA) | | 1.5 | 1.5 | 1.5 | 1.5 | 1.5 |
| Paint final prepare step | Water-soluble resin emulsion | Acrylic resin A (Solid content: 47%) | 12(5.64) | 36.7(17.25) | 8.1(3.81) | 22.1(10.39) | 30.1(14.15) |
| | | Acrylic resin B (Solid content: 45%) | | | | | |
| | | Acrylic resin C (Solid content: 50%) | | | | | |
| | | Acrylic resin D (Solid content: 30%) | | | | | |
| | Additive | | 6.5 | 5.4 | 6.8 | 5.9 | 5.5 |
| Total (Unit: parts by mass) | | | 100 | 100 | 100 | 100 | 100 |
| Total concentration of activated carbon and manganese oxide-based catalyst*1 | | | 65% | 30% | 75% | 45% | 35% |
| Ozone decomposition performance | | | Excellent | Good | Excellent | Excellent | Good |
| Weather resistance | | | Good | Excellent | Fair | Good | Good |

| | | Example 1-6 | Example 1-7 | Example 1-8 |
|---|---|---|---|---|
| Dispersion step | Activated carbon | 2.0 | 3.2 | 2.2 |
| | Manganese oxide-based catalyst | 4.7 | 7.2 | 5.1 |
| | Dispersant(Polyacrylate-based) | 0.4 | 0.5 | 0.4 |
| | Water | 44.5 | 68.6 | 47.1 |
| Neutralization step | Triethylamine (TEA) | 1.5 | 1.5 | 1.5 |

TABLE 2-continued

| | | | | | |
|---|---|---|---|---|---|
| Paint final prepare step | Water-soluble resin emulsion | Acrylic resin A (Solid content: 47%) | 42.7(20.07) | | |
| | | Acrylic resin B (Solid content: 45%) | | 12.5(5.63) | 38.3(19.15) |
| | | Acrylic resin C (Solid content: 50%) | | | |
| | | Acrylic resin D (Solid content: 30%) | | | |
| | Additive | | 4.2 | 6.5 | 5.4 |
| Total (Unit: parts by mass) | | | 100 | 100 | 100 |
| Total concentration of activated carbon and manganese oxide-based catalyst*1 | | | 25% | 65% | 30% |
| Ozone decomposition performance | | | Fair | Excellent | Good |
| Weather resistance | | | Excellent | Good | Excellent |

*1Total concentration of activated carbon and manganese oxide-based catalyst (%) = (Activated carbon mass + Manganese oxide-based catalyst mass)/(Resin mass + Activated carbon mass + Manganese oxide-based catalyst mass) × 100

As shown in Table 2, the examples 1-1 to 1-6 employed the acrylic resin A (resin solid content: 47 wt %, minimum film-forming temperature (MFT): 40° C., glass-transition temperature $T_g$: 70° C.) as the water-soluble resin. The examples 1-1 to 1-6 differ in the total concentration of the manganese dioxide-based catalyst and the activated carbon.

The water-based paint composition of the example 1-1 includes 3.2 g of the activated carbon, 7.2 g of the manganese dioxide-based catalyst, and 5.64 g (solid content) of the acrylic resin A. Thus, the total content of the manganese dioxide-based catalyst and the activated carbon is 65 (round off to the closest whole number, the same applies hereinafter) parts by mass per 100 parts by mass of the total content of the acrylic resin A, the manganese dioxide-based catalyst, and the activated carbon.

For the example 1-1, the content of the acrylic resin A is 54 parts by mass per 100 parts by mass of the total content of the manganese dioxide-based catalyst and the activated carbon, and 78 parts by mass per 100 parts by mass of the manganese dioxide-based catalyst. The content of the manganese dioxide-based catalyst is 225 parts by mass per 100 parts by mass of the activated carbon, and 45 parts by mass per 100 parts by mass of the total content of the acrylic resin A, the manganese dioxide-based catalyst, and the activated carbon.

The water-based paint composition of the example 1-2 includes 2.2 g of the activated carbon, 5.1 g of the manganese dioxide-based catalyst, and 17.25 g (solid content) of the acrylic resin A. Thus, the total content of the manganese dioxide-based catalyst and the activated carbon is 30 parts by mass per 100 parts by mass of the total content of the acrylic resin A, the manganese dioxide-based catalyst, and the activated carbon.

For the example 1-2, the content of the acrylic resin A is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the acrylic resin A, the manganese dioxide-based catalyst, and the activated carbon.

The water-based paint composition of the example 1-3 includes 3.6 g of the activated carbon, 8.0 g of the manganese dioxide-based catalyst, and 3.81 g (solid content) of the acrylic resin A. Thus, the total content of the manganese dioxide-based catalyst and the activated carbon is 75 parts by mass per 100 parts by mass of the total content of the acrylic resin A, the manganese dioxide-based catalyst, and the activated carbon.

For the example 1-3, the content of the acrylic resin A is 33 parts by mass per 100 parts by mass of the total content of the manganese dioxide-based catalyst and the activated carbon, and 48 parts by mass per 100 parts by mass of the manganese dioxide-based catalyst. The content of the manganese dioxide-based catalyst is 222 parts by mass per 100 parts by mass of the activated carbon, and 52 parts by mass per 100 parts by mass of the total content of the acrylic resin A, the manganese dioxide-based catalyst, and the activated carbon.

The water-based paint composition of the example 1-4 includes 2.6 g of the activated carbon, 5.9 g of the manganese dioxide-based catalyst, and 10.39 g (solid content) of the acrylic resin A. Thus, the total content of the manganese dioxide-based catalyst and the activated carbon is 45 parts by mass per 100 parts by mass of the total content of the acrylic resin A, the manganese dioxide-based catalyst, and the activated carbon.

For the example 1-4, the content of the acrylic resin A is 122 parts by mass per 100 parts by mass of the total content of the manganese dioxide-based catalyst and the activated carbon, and 176 parts by mass per 100 parts by mass of the manganese dioxide-based catalyst. The content of the manganese dioxide-based catalyst is 227 parts by mass per 100 parts by mass of the activated carbon, and 31 parts by mass per 100 parts by mass of the total content of the acrylic resin A, the manganese dioxide-based catalyst, and the activated carbon.

The water-based paint composition of the example 1-5 includes 2.3 g of the activated carbon, 5.3 g of the manganese dioxide-based catalyst, and 14.15 g (solid content) of the acrylic resin A. Thus, the total content of the manganese dioxide-based catalyst and the activated carbon is 35 parts by mass per 100 parts by mass of the total content of the acrylic resin A, the manganese dioxide-based catalyst, and the activated carbon.

For the example 1-5, the content of the acrylic resin A is 186 parts by mass per 100 parts by mass of the total content of the manganese dioxide-based catalyst and the activated carbon, and 267 parts by mass per 100 parts by mass of the manganese dioxide-based catalyst. The content of the manganese dioxide-based catalyst is 230 parts by mass per 100 parts by mass of the activated carbon, and 24 parts by mass per 100 parts by mass of the total content of the acrylic resin A, the manganese dioxide-based catalyst, and the activated carbon.

The water-based paint composition of the example 1-6 includes 2.0 g of the activated carbon, 4.7 g of the manganese dioxide-based catalyst, and 20.07 g (solid content) of the acrylic resin A. Thus, the total content of the manganese dioxide-based catalyst and the activated carbon is 75 parts by mass per 100 parts by mass of the total content of the acrylic resin A, the manganese dioxide-based catalyst, and the activated carbon.

For the examples 1-6, the content of the acrylic resin A is 300 parts by mass per 100 parts by mass of the total content of the manganese dioxide-based catalyst and the activated carbon, and 427 parts by mass per 100 parts by mass of the manganese dioxide-based catalyst. The content of the manganese dioxide-based catalyst is 235 parts by mass per 100 parts by mass of the activated carbon, and 18 parts by mass per 100 parts by mass of the total content of the acrylic resin A, the manganese dioxide-based catalyst, and the activated carbon.

In the examples 1-1 to 1-6 using the acrylic resin A and different total concentration of the manganese dioxide-based catalyst and the activated carbon, as the total concentration of the manganese dioxide-based catalyst and the activated carbon deceases, the weather resistance or chalking resistance increases although the ozone decomposition ratio decreases (referring to Table 2). That is, as the total concentration of the manganese dioxide-based catalyst and the activated carbon increases, the ozone decomposition ratio increases although the weather resistance or chalking resistance decreases.

For the example 1-3 using 75% the total concentration of the manganese dioxide-based catalyst and the activated carbon, the ozone decomposition ratio was 99.9%. For the example 1-1 using 65% the total concentration of the manganese dioxide-based catalyst and the activated carbon, the ozone decomposition ratio was 99.8%. For the example 1-4 using 45% the total concentration of the manganese dioxide-based catalyst and the activated carbon, the ozone decomposition ratio was 99.8%. For the example 1-5 using 35% the total concentration of the manganese dioxide-based catalyst and the activated carbon, the ozone decomposition ratio was 87.2%. For the example 1-2 using 30% the total concentration of the manganese dioxide-based catalyst and the activated carbon, the ozone decomposition ratio was 80.9%. For the example 1-2 using 25% the total concentration of the manganese dioxide-based catalyst and the activated carbon, the ozone decomposition ratio was 75.2%.

For above 75% the total concentration of the manganese dioxide-based catalyst and the activated carbon, the weather resistance may decrease. For below 25% total concentration of the manganese dioxide-based catalyst and the activated carbon, the ozone decomposition ratio may decrease. The higher total concentration of the manganese dioxide-based catalyst and the activated carbon provides higher performance to decompose ozone. However, the higher total concentration of the manganese dioxide-based catalyst and the activated carbon leads to the lower content of the water based-soluble resin. Thus, the photocatalysis of the manganese dioxide-based catalyst may accelerate the degradation of the resin exposed to light including sunlight and cause chalking of the coating film. From the point of view of higher ozone composition performance, the total concentration of the manganese dioxide-based catalyst and the activated carbon should preferably be 25% or more, more preferably 30% or more, further preferably 45% or more. From the point of view of higher weather resistance, the total concentration of the manganese dioxide-based catalyst and the activated carbon should preferably be 75% or less, more preferably 70% or less, further preferably 65% or less. The total concentration of the manganese dioxide-based catalyst and the activated carbon should preferably be in the range from 25 to 75%. This enables the combining of high performance to decompose ozone and high weather resistance. The total concentration of the manganese dioxide-based catalyst and the activated carbon should more preferably be in the range from 30 to 70%, further preferably 30 to 65%.

The examples 1-7 and 1-8 employed the acrylic resin B (resin solid content: 47 wt %, minimum film-forming temperature (MFT): 100° C., glass-transition temperature $T_g$: −20° C.) as the water-soluble resin. The examples 1-7 and 1-8 differ in the total concentration of the manganese dioxide-based catalyst and the activated carbon.

The water-based paint composition of the example 1-7 includes 3.2 g of the activated carbon, 7.2 g of the manganese dioxide-based catalyst, and 5.63 g (solid content) of the acrylic resin B. Thus, the total content of the manganese dioxide-based catalyst and the activated carbon is 65 parts by mass per 100 parts by mass of the total content of the acrylic resin B, the manganese dioxide-based catalyst, and the activated carbon.

For the example 1-7, the content of the acrylic resin B is 54 parts by mass per 100 parts by mass of the total content of the manganese dioxide-based catalyst and the activated carbon, and 78 parts by mass per 100 parts by mass of the manganese dioxide-based catalyst. The content of the manganese dioxide-based catalyst is 225 parts by mass per 100 parts by mass of the activated carbon, and 50 parts by mass per 100 parts by mass of the total content of the acrylic resin B, the manganese dioxide-based catalyst, and the activated carbon.

The water-based paint composition of the example 1-8 includes 2.2 g of the activated carbon, 5.1 g of the manganese dioxide-based catalyst, and 19.15 g (solid content) of the acrylic resin B. Thus, the total content of the manganese dioxide-based catalyst and the activated carbon is 30 parts by mass per 100 parts by mass of the total content of the acrylic resin B, the manganese dioxide-based catalyst, and the activated carbon.

For the example 1-8, the content of the acrylic resin B is 262 parts by mass per 100 parts by mass of the total content of the manganese dioxide-based catalyst and the activated carbon, and 376 parts by mass per 100 parts by mass of the manganese dioxide-based catalyst. The content of the manganese dioxide-based catalyst is 232 parts by mass per 100 parts by mass of the activated carbon, and 19 parts by mass per 100 parts by mass of the total content of the acrylic resin B, the manganese dioxide-based catalyst, and the activated carbon.

The examples 1-9 and 1-10 employed the acrylic resin C (resin solid content: 50 wt %, minimum film-forming temperature (MFT): 60° C., glass-transition temperature $T_g$: 90° C.) as the water-soluble resin. The examples 1-9 and 1-10 differ in the total concentration of the manganese dioxide-based catalyst and the activated carbon.

The water-based paint composition of the example 1-9 includes 3.2 g of the activated carbon, 7.2 g of the manganese dioxide-based catalyst, and 5.65 g (solid content) of the acrylic resin C. Thus, the total content of the manganese dioxide-based catalyst and the activated carbon is 65 parts by mass per 100 parts by mass of the total content of the acrylic resin C, the manganese dioxide-based catalyst, and the activated carbon.

For the example 1-9, the content of the acrylic resin C is 54 parts by mass per 100 parts by mass of the total content of the manganese dioxide-based catalyst and the activated carbon, and 79 parts by mass per 100 parts by mass of the manganese dioxide-based catalyst. The content of the manganese dioxide-based catalyst is 225 parts by mass per 100 parts by mass of the activated carbon, and 50 parts by mass per 100 parts by mass of the total content of the acrylic resin C, the manganese dioxide-based catalyst, and the activated carbon.

The water-based paint composition of the example 1-10 includes 2.2 g of the activated carbon, 5.1 g of the manganese dioxide-based catalyst, and 17.25 g (solid content) of the acrylic resin C. Thus, the total content of the manganese dioxide-based catalyst and the activated carbon is 30 parts by mass per 100 parts by mass of the total content of the acrylic resin C, the manganese dioxide-based catalyst, and the activated carbon.

For the example 1-10, the content of the acrylic resin C is 236 parts by mass per 100 parts by mass of the total content of the manganese dioxide-based catalyst and the activated carbon, and 337 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the acrylic resin C, the manganese dioxide-based catalyst, and the activated carbon.

The example 1-11 employed the acrylic resin D (resin solid content: 30 wt %, minimum film-forming temperature (MFT): 70° C., glass-transition temperature $T_g$: 120° C.) as the water-soluble resin.

The water-based paint composition of the example 1-11 includes 2.2 g of the activated carbon, 5.1 g of the manganese dioxide-based catalyst, and 17.25 g (solid content) of the acrylic resin D. Thus, the total content of the manganese dioxide-based catalyst and the activated carbon is 30 parts by mass per 100 parts by mass of the total content of the acrylic resin D, the manganese dioxide-based catalyst, and the activated carbon.

For the example 1-11, the content of the acrylic resin D is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the acrylic resin D, the manganese dioxide-based catalyst, and the activated carbon.

As seen from the examples 1-1 to 1-11 shown in Table 2, it should be appreciated that every acrylic resin allowed the coating film to be resistant to weather. The examples 1-1 to 1-11, in which the total content of the manganese dioxide-based catalyst and the activated carbon of was in range of 15 to 75%, showed both high weather resistance and high performance to decompose ozone.

In general, the lower glass transition temperature is, the more molecule motion in room temperatures. Thus, the lower glass transition temperature causes the degradation reaction activates. However, as seen from comparisons of examples 1-2, 1-8, 1-10, and 1-11, for the acrylic resin, the lower glass transition temperature $T_g$ is, the higher weather resistance is. This may be because the acrylic resin with a lower glass transition temperature $T_g$ has the larger number of the carbon of side chains and needs high energy to dissociate the chain.

The acrylic resin with glass transition temperature $T_g$ of 130° C. or less provides good weather resistance. Preferably, the glass transition temperature $T_g$ of the acrylic resin is 120° C. or less, more preferably 900° C. or less, particularly preferably 70° C. or less. However, too low a glass transition temperature $T_g$ of the acrylic resin may fail to provide low heat resistance and may be unusable in high temperature. Thus, the glass transition temperature $T_g$ of the acrylic resin is preferably −30° C. or more, more preferably −25° C. or more, further preferably −20° C. or more.

The water-based paint compositions were made using different acrylic resins and according to the formulation shown in Table 3. Such water-based paint compositions will be further specifically described with reference to examples. The examples 2-1 and 2-2 in Table 3 are the same as the examples 2-1 and 2-2 in Table 1. The examples 2-3 to 2-4 were made as described above.

TABLE 3

| | | | Example 2-1 | Example 2-2 | Example 2-3 | Example 2-4 |
|---|---|---|---|---|---|---|
| Dispersion step | | Activated carbon | 3.2 | 2.2 | 2.2 | 2.2 |
| | | Manganese oxide-based catalyst | 7.2 | 5.1 | 5.1 | 5.1 |
| | | Dispersant(Polyacrylate-based) | 0.5 | 0.4 | 0.4 | 0.4 |
| | | Water | 62.5 | 27.9 | 27.9 | 47.1 |
| Neutralization step | | Triethylamine (TEA) | 1.5 | 1.5 | 1.5 | 1.5 |
| Paint final prepare step | Water-soluble resin emulsion | Acrylic resin A (Solid content: 30%) | 18.6(5.58) | 57.5(17.25) | | |
| | | Acrylic resin B (Solid content: 30%) | | | 57.5(17.25) | |
| | | Acrylic resin C (Solid content: 45%) | | | | 38.3(17.24) |
| | | Additive | 6.5 | 5.4 | 5.4 | 5.4 |
| Total (Unit: parts by mass) | | | 100 | 100 | 100 | 100 |
| Total concentration of activated carbon and manganese oxide-based catalyst*1 | | | 65% | 30% | 30% | 30% |
| Ozone decomposition performance | | | Good | Good | Good | Good |
| Weather resistance | | | Good | Excellent | Good | Fair |

*1Total concentration of activated carbon and manganese oxide-based catalyst (%) = (Activated carbon mass + Manganese oxide-based catalyst mass)/(Resin mass + Activated carbon mass + Manganese oxide-based catalyst mass) × 100

As described above, the examples 2-1 to 2-2 employed the modified acrylic resin A (resin solid content: 30 wt %, minimum film-forming temperature: 20° C., glass-transition temperature $T_g$: 70° C.) as the water-soluble resin.

The example 2-3 employed the modified acrylic resin B (resin solid content: 30 wt %, minimum film-forming temperature: 50° C., glass-transition temperature $T_g$: 80° C.) as the water-soluble resin.

The example 2-4 employed the modified acrylic resin C (resin solid content: 45 wt %, minimum film-forming temperature: 70° C., glass-transition temperature $T_g$: 110° C.) as the water-soluble resin.

The water-based paint composition of the example 2-1 includes 3.2 g of the activated carbon, 7.2 g of the manganese dioxide-based catalyst, and 5.58 g (solid content) of the modified acrylic resin A. Thus, the total content of the manganese dioxide-based catalyst and the activated carbon is 65 parts by mass per 100 parts by mass of the total content of the modified acrylic resin A, the manganese dioxide-based catalyst, and the activated carbon.

For the example 2-1, the content of the modified acrylic resin A is 54 parts by mass per 100 parts by mass of the total content of the manganese dioxide-based catalyst and the activated carbon, and 78 parts by mass per 100 parts by mass of the manganese dioxide based catalyst. The content of the manganese dioxide-based catalyst is 225 parts by mass per 100 parts by mass of the activated carbon, and 45 parts by mass per 100 parts by mass of the total content of the modified acrylic resin A, the manganese dioxide-based catalyst, and the activated carbon.

The water-based paint composition of the example 2-2 includes 2.2 g of the activated carbon, 5.1 g of the manganese dioxide-based catalyst, and 17.25 g (solid content) of the modified acrylic resin A. Thus, the total content of the manganese dioxide-based catalyst and the activated carbon is 30 parts by mass per 100 parts by mass of the total content of the modified acrylic resin A, the manganese dioxide based catalyst, and the activated carbon.

For the example 2-2, the content of the modified acrylic resin A is 236 parts by mass per 100 parts by mass of the total content of the manganese dioxide based catalyst and the activated carbon, and 338 parts by mass per 100 parts by mass of the manganese dioxide based catalyst. The content of the manganese dioxide based catalyst is 232 parts by mass per 100 parts by mass of the activated carbon, and 21 parts by mass per 100 parts by mass of the total content of the modified acrylic resin A, the manganese dioxide-based catalyst, and the activated carbon.

The water-based paint composition of the example 2-3 includes 2.2 g of the activated carbon, 5.1 g of the manganese dioxide-based catalyst, and 17.25 g (solid content) of the modified acrylic resin B. Thus, the total content of the manganese dioxide-based catalyst and the activated carbon is 30 parts by mass per 100 parts by mass of the total content of the modified acrylic resin B, the manganese dioxide-based catalyst, and the activated carbon.

For the example 2-3, the content of the modified acrylic resin B is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the modified acrylic resin B, the manganese dioxide-based catalyst, and the activated carbon.

The water-based paint composition of the example 2-4 includes 2.2 g of the activated carbon, 5.1 g of the manganese dioxide-based catalyst, and 17.24 g (solid content) of the modified acrylic resin C. Thus, the total content of the manganese dioxide-based catalyst and the activated carbon is 30 parts by mass per 100 parts by mass of the total content of the modified acrylic resin C, the manganese dioxide-based catalyst, and the activated carbon.

For the example 2-4, the content of the modified acrylic resin C is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the modified acrylic resin C, the manganese dioxide-based catalyst, and the activated carbon.

As seen from the examples 2-1 to 2-4, it should be appreciated that every modified acrylic resin allowed the coating film to have resistant to weather. Additionally, the examples 2-1 to 2-4, in which the total content of the manganese dioxide-based catalyst and the activated carbon is in range of 30 to 65%, showed high performance to decompose ozone.

In particular, as seen from comparisons of the examples 2-2, 2-3, and 2-4, the modified acrylic resin with lower glass transition temperature $T_g$ allows the coating film to have higher weather resistance. The modified acrylic resin with glass transition temperature $T_g$ of 130° C. or less allows the coating film to have good weather resistance. The glass transition temperature $T_g$ of the modified acrylic resin is more preferably 110° C. or less, further preferably 80° C. or less, particularly preferably 70° C. or less. However, too low a glass transition temperature $T_g$ of the modified acrylic resin may fail to provided intended heat resistance and may be unusable in high temperature. Thus, the glass transition temperature $T_g$ of the modified acrylic resin is preferably −30° C. or more, more preferably −25° C. or more, further preferably −20° C. or more.

The water-based paint compositions were made using different fluorocarbon resins and according to the formulation shown in Table 4. Such water-based paint compositions will be further specifically described with reference to examples. The examples 3-1 and 3-2 in Table 4 are the same as the examples 3-1 and 3-2 in Table 1. The examples 3-3 and 3-4 were made as described above.

TABLE 4

| | | Example 3-1 | Example 3-2 | Example 3-3 | Example 3-4 |
|---|---|---|---|---|---|
| Dispersion step | Activated carbon | 3.2 | 2.2 | 2.2 | 2.2 |
| | Manganese oxide-based catalyst | 7.2 | 5.1 | 5.1 | 5.1 |
| | Dispersant(Polyacrylate-based) | 0.5 | 0.4 | 0.4 | 0.4 |
| | Water | 70 | 50.9 | 50.9 | 47.1 |

TABLE 4-continued

| | | | Example 3-1 | Example 3-2 | Example 3-3 | Example 3-4 |
|---|---|---|---|---|---|---|
| Neutralization step | Triethylamine (TEA) | | 1.5 | 1.5 | 1.5 | 1.5 |
| Paint final prepare step | Water-soluble resin emulsion | Acrylic resin A (Solid content: 50%) | 18.6(5.58) | 57.5(17.25) | | |
| | | Acrylic resin B (Solid content: 50%) | | | 34.5(17.25) | |
| | | Acrylic resin C (Solid content: 45%) | | | | 38.3(17.24) |
| | Additive | | 6.5 | 5.4 | 5.4 | 5.4 |
| Total (Unit: parts by mass) | | | 100 | 100 | 100 | 100 |
| Total concentration of activated carbon and manganese oxide-based catalyst*1 | | | 65% | 30% | 30% | 30% |
| Ozone decomposition performance | | | Good | Good | Good | Good |
| Weather resistance | | | Good | Excellent | Good | Fair |

*1Total concentration of activated carbon and manganese oxide-based catalyst (%) = (Activated carbon mass + Manganese oxide-based catalyst mass)/(Resin mass + Activated carbon mass + Manganese oxide-based catalyst mass) × 100

As described above, the examples 3-1 and 3-2 employed the fluorocarbon resin A (resin solid content: 50 wt %, minimum film-forming temperature: 50° C., glass-transition temperature $T_g$: 50° C.) as the water-soluble resin.

The example 3-3 employed the fluorocarbon resin B (resin solid content: 50 wt %, minimum film-forming temperature: 70° C., glass-transition temperature $T_g$: 80° C.) as the water-soluble resin.

The example 3-4 employed the fluorocarbon resin C (resin solid content: 45 wt %, minimum film-forming temperature: 70° C., glass-transition temperature $T_g$: 90° C.) as the water-soluble resin.

The water-based paint composition of the example 3-1 includes 3.2 g of the activated carbon, 7.2 g of the manganese dioxide-based catalyst, and 5.58 g (solid content) of the fluorocarbon resin A. Thus, the total content of the manganese dioxide-based catalyst and the activated carbon is 65 parts by mass per 100 parts by mass of the total content of the fluorocarbon resin A, the manganese dioxide-based catalyst, and the activated carbon.

For the example 3-1, the content of the fluorocarbon resin A is 54 parts by mass per 100 parts by mass of the total content of the manganese dioxide-based catalyst and the activated carbon, and 78 parts by mass per 100 parts by mass of the manganese dioxide-based catalyst. The content of the manganese dioxide-based catalyst is 225 parts by mass per 100 parts by mass of the activated carbon, and 45 parts by mass per parts by mass of the total content of the fluorocarbon resin A, the manganese dioxide-based catalyst, and the activated carbon.

The water-based paint composition of the example 3-2 includes 2.2 g of the activated carbon, 5.1 g of the manganese dioxide-based catalyst, and 17.25 g (solid content) of the fluorocarbon resin A. Thus, the total content of the manganese dioxide-based catalyst and the activated carbon is 30 parts by mass per 100 parts by mass of the total content of the fluorocarbon resin A, the manganese dioxide based catalyst, and the activated carbon.

For the example 3-2, the content of the fluorocarbon resin A is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the fluorocarbon resin A, the manganese dioxide-based catalyst, and the activated carbon.

The water-based paint composition of the example 3-3 includes 2.2 g of the activated carbon, 5.1 g of the manganese dioxide-based catalyst, and 17.25 g (solid content) of the fluorocarbon resins B. Thus, the total content of the manganese dioxide-based catalyst and the activated carbon is 30 parts by mass per 100 parts by mass of the total content of the fluorocarbon resin B, the manganese dioxide-based catalyst, and the activated carbon.

For the example 3-3, the content of the fluorocarbon resin B is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the fluorocarbon resin B, the manganese dioxide-based catalyst, and the activated carbon.

The water-based paint composition of the example 3-4 includes 2.2 g of the activated carbon, 5.1 g of the manganese dioxide-based catalyst, and 17.24 g (solid content) of the fluorocarbon resin C. Thus, the total content of the manganese dioxide-based catalyst and the activated carbon is 30 parts by mass per 100 parts by mass of the total content of the fluorocarbon resin C, the manganese dioxide-based catalyst, and the activated carbon.

For the example 3-4, the content of the fluorocarbon resin C is 236 parts by mass per 100 parts by mass of the total content of the manganese dioxide-based catalyst and the activated carbon, and 338 parts by mass per 100 parts by mass of the manganese dioxide-based catalyst. The content of the manganese dioxide-based catalyst is 232 parts by mass per 100 parts by mass of the activated carbon, and 21 parts by mass per 100 parts by mass of the total content of the fluorocarbon resin C, the manganese dioxide-based catalyst, and the activated carbon.

As seen from the examples 3-1 to 3-4, it should be appreciated that every fluorocarbon resin allowed the coating film to be resistant to weather. Additionally, the examples 3-1 to 3-4, in which the total content of the manganese dioxide-based catalyst and the activated carbon is in range of 30 to 65%, showed high performance to decompose ozone.

In particular, as seen from comparisons of the examples 3-2, 3-3, and 3-4, the fluorocarbon resin with lower glass transition temperature $T_g$ allows the coating film to have higher weather resistance. The fluorocarbon resin with glass transition temperature $T_g$ of 100° C. or less allows the coating film to have good weather resistance. The glass transition temperature $T_g$ of the fluorocarbon resin is more preferably 90° C. or less, further preferably 80° C. or less, particularly preferably 50° C. or less. However, too low a glass transition temperature $T_g$ of the fluorocarbon resin may fail to provide intended heat resistance and may be unusable in high temperature. Thus, the glass transition temperature $T_g$ of the fluorocarbon resin is preferably −30° C. or more, more preferably −25° C. or more, further preferably −20° C. or more.

Every water-based paint composition of above examples was preserved at 20° C., and after one month, whether each composition has agglomeration or flocculation or not was observed. Every water-based paint composition, which had been preserved for one month at 20° C., had no agglomeration or flocculation. Thus, every water-based paint composition has good storage stability. Furthermore, every water-based paint composition of above examples gave the coating film to have good adhesion to metal bases and non-metal bases including resin bases.

The inventors determined the preferable content of the coating film components including the manganese oxide-based catalyst, the activated carbon, which both have ozone decomposition performance, and the water-soluble resin selected from the group consisting of the acrylic resin, the modified acrylic resin, and the fluorocarbon resin. The content of the water-soluble resin selected from the group consisting of the acrylic resin, the modified acrylic resin, and the fluorocarbon resin is preferably in range of 20 to 400 parts by mass, more preferably 25 to 350 parts by mass, further preferably 30 to 300 parts by mass, particularly preferably 50 to 280 parts by mass, per 100 parts by mass of the total solid content of the activated carbon and the manganese oxide-based catalyst.

The higher content of the water-soluble resin selected from the group consisting of the acrylic resin, the modified acrylic resin, and the fluorocarbon resin to the manganese oxide-based catalyst and the activated carbon leads to the lower content of the total solid content of the activated carbon and the manganese oxide-based catalyst and thus would fail to provide intended performance to decompose ozone. Thus, the content of the water-soluble resin selected from the group consisting of the acrylic resin, the modified acrylic resin, and the fluorocarbon resin is preferably 400 and less, more preferably 350 and less, further preferably 300 and less, particularly preferably 280 and less parts by mass per 100 parts by mass of the total solid content of the activated carbon and the manganese oxide-based catalyst. The lower content of the water-soluble resin to the manganese oxide-based catalyst and the activated carbon leads to the higher content of the total solid content of the activated carbon and the manganese oxide-based catalyst and thus may cause the coating film to be weak, deteriorated easily, and lowly resistant to chalking. Thus, the content of the water-soluble resin is preferably 20 and more, more preferably 25 and more, further preferably 30 and more, particularly preferably 50 and more parts by mass, per 100 parts by mass of the total solid content of the activated carbon and the manganese oxide-based catalyst. Such a content allows the combination of ozone decomposition performance and resistance to chalking and weather.

The content of the water-soluble resin selected from the group consisting of the acrylic resin, the modified acrylic resin, and the fluorocarbon resin is preferably in range of 30 to 500 parts by mass, more preferably 40 to 480 parts by mass, further preferably 45 to 450 parts by mass, particularly preferably 70 to 400 parts by mass, per 100 parts by mass of the manganese oxide-based catalyst.

The higher content of the water-soluble resin selected from the group consisting of the acrylic resin, the modified acrylic resin, and the fluorocarbon resin to the manganese oxide-based catalyst results in the lower content of the manganese oxide-based catalyst with ozone decomposition performance and thus would fail to provide intended synergistic performance of the manganese oxide-based catalyst and the activated carbon to decompose ozone. Thus, the content of the water-soluble resin is preferably 500 and less, more preferably 480 and less, further preferably 450 and less, particularly preferably 400 and less parts by mass, per 100 parts by mass of the content of the manganese oxide-based catalyst. The lower content of the water-soluble resin to the manganese oxide-based catalyst results in the higher content of the manganese oxide-based catalyst and may cause the coating film to be lower resistant to chalking. Thus, the content of the water-soluble resin is preferably 30 and more, more preferably 40 and more, further preferably 45 and more, particularly preferably 70 and more parts by mass, per 100 parts by mass of the content of the manganese oxide-based catalyst. Such content allows the combination of ozone decomposition performance and resistance to chalking and weather.

The content of the manganese oxide-based catalyst is preferably in range of 11 to 900 parts by mass, more preferably 15 to 800 parts by mass, further preferably 20 to 700 parts by mass, per 100 parts by mass of the activated carbon.

Too high content of the activated carbon to the manganese oxide-based catalyst may fail to provide intended resistance to weather and may increase material costs. Thus, the content of the manganese oxide-based catalyst is preferably 900 and less, more preferably 800 and less, further preferably 700 and less parts by mass, per 100 parts by mass of the content of the activated carbon. Too low content of the activated carbon leads to the higher content of the manganese oxide-based catalyst and thus may cause lower dispersing of the activated carbon, which is easily agglomerated or flocculated, and lower applying performance. Thus, the content of the manganese oxide-based catalyst is preferably 11 and more, more preferably 15 and more, further preferably 20 and more parts by mass, per 100 parts by mass of the content of the activated carbon. Such a content allows combination of applying performance and resistance to weather. Further, such a content allows lower cost.

The content of the manganese oxide-based catalyst is preferably in range of 5 to 65 parts by mass, more preferably 10 to 60 parts by mass, further preferably 15 to 55 parts by mass, particularly preferably 18 to 50 parts by mass, per 100 parts by mass of the total content of the manganese oxide-based catalyst, the activated carbon, and the water-soluble resin.

Too high concentration of the manganese oxide-based catalyst, which is the coating film component, may fail to provide intended resistance to weather. Thus, the content of the manganese oxide-based catalyst is preferably 65 and less, more preferably 60 and less, further preferably 55 and less, particularly preferably 50 and less parts by mass, per 100 parts by mass of the total content of the manganese oxide-based catalyst, the activated carbon, and the water-soluble resin.

Too low concentration of the manganese oxide-based catalyst may fail to provide intended synergistic performance of the manganese oxide-based catalyst and the activated carbon to decompose ozone. Thus, the content of the manganese oxide-based catalyst is preferably 5 and more, more preferably 10 and more, further preferably 15 and more, particularly preferably 18 and more parts by mass, per 100 parts by mass of the total content of the manganese oxide-based catalyst, the activated carbon, and the water-soluble resin. Such content allows the combination of ozone decomposition performance and resistance to weather.

In the water-based paint composition, the content of the activated carbon is preferably 1 to 40 mass %, more preferably 1.5 to 20 mass %, further preferably 2 to 10 mass %, particularly preferably 2 to 5 mass %, the content of the manganese dioxide-based catalyst is preferably 1 to 40 mass %, more preferably 2 to 20 mass %, further preferably 3 to 15 mass %, particular preferably 4 to 10 mass %, the content of the dispersant is preferably 0.2 to 2 mass %, more preferably 0.3 to 1 mass %, further preferably 0.3 to 0.8 mass %, the content of the water-soluble resin selected from the group consisting of the acrylic resin, the modified acrylic resin, and the fluorocarbon resin in terms of solid content is preferably 2 to 30 mass %, more preferably 2 to 25 mass %, further preferably 3 to 25 mass %, the content of the pH modifier is preferably 0.1 to 5 mass %, more preferably 0.5 to 4 mass %, further preferably 1 to 3 mass %, the content of the additive is preferably 0 to 10 mass %, more preferably 1 to 8 mass %, further preferably 3 to 8 mass %.

In the coating film, the content of the activated carbon is preferably 3 to 60 mass %, more preferably 4 to 35 mass %, further preferably 5 to 30 mass %, particular preferably 5 to 25 mass %, the content of the manganese dioxide-based catalyst is preferably 3 to 60 mass %, more preferably 5 to 60 mass %, further preferably 10 to 60 mass %, particular preferably 15 to 50 mass %, the content of the water-soluble resin selected from the group consisting of the acrylic resin, the modified acrylic resin, and the fluorocarbon resin in terms of solid content is preferably 15 to 90 mass %, more preferably 25 to 85 mass %, further preferably 25 to 85 mass %.

The hardened coating film, which is formed by applying the water-based paint composition, includes at least one binder selected from the group consisting of the acrylic resin, the modified acrylic resin, and the fluorocarbon resin to the base and drying it, is less prone to chalking in interface thereof and delamination. This is because, although the manganese oxide-based catalyst may have photocatalysis, the acrylic resin, the modified acrylic resin, and the fluorocarbon resin less prone to degradation and breakdown and the manganese oxide-based catalyst is less peelable from the resin.

The hardened coating film might generate oxygen through ozone decomposition and thus generate state promoting photooxidation. The manganese oxide-based catalyst such as the manganese dioxide-based catalyst might generate free radicals such as hydroxyl radicals, superoxide anions ($O_2$–), and perhydroxy radicals through light absorption causing the interaction of oxygen and moisture. Thus, it might be considered that the resin degradation is promoted by the photocatalysis of the manganese dioxide-based catalyst. However, the acrylic resin, the modified acrylic resin, and the fluorocarbon resin as a binder allows the coating film, although having photocatalysis, to less prone to chalking and be highly resistant to weather.

The degradation of the coating film components might also be affected by the components of the base, which the water-based paint composition is to be applied to. However, the coating film formed on the base is good resistance to weather whether the base is made of metal or non-metal such as resins.

The water-based paint composition of the present embodiment, which includes at least one of the acrylic resin, the modified acrylic resin, or the fluorocarbon resin as the water-soluble resin, allows the hardened coating film, although including the manganese dioxide-based catalyst with photocatalysis, to be highly resistant to chalking and weather. When the water-based paint composition is applied to a site exposed to light including sunlight, the hardened coating film is less prone to chalking and has high durability. Thus, the water-based paint composition is applicable to various sites.

Examples of coated articles, to which the water-based paint composition of the present embodiment is applied, include vehicles such as cars. For cars, the water-based paint composition is to be applied to a site exposed to air flow, such as a radiator, or an electric fan, a grill, a grill shutter, or an undercover, which are near a radiator. A large amount of air passes through the site to an engine room while the car is traveling. Thus, the application of the water-based paint composition to the site allows the coating film to decompose ozone coming in contact with the coating film, decreasing or eliminating ozone in air. This allows air to be purified effectively and decrease in generation of harmful substances in the environment while the car is traveling.

Figure 2:
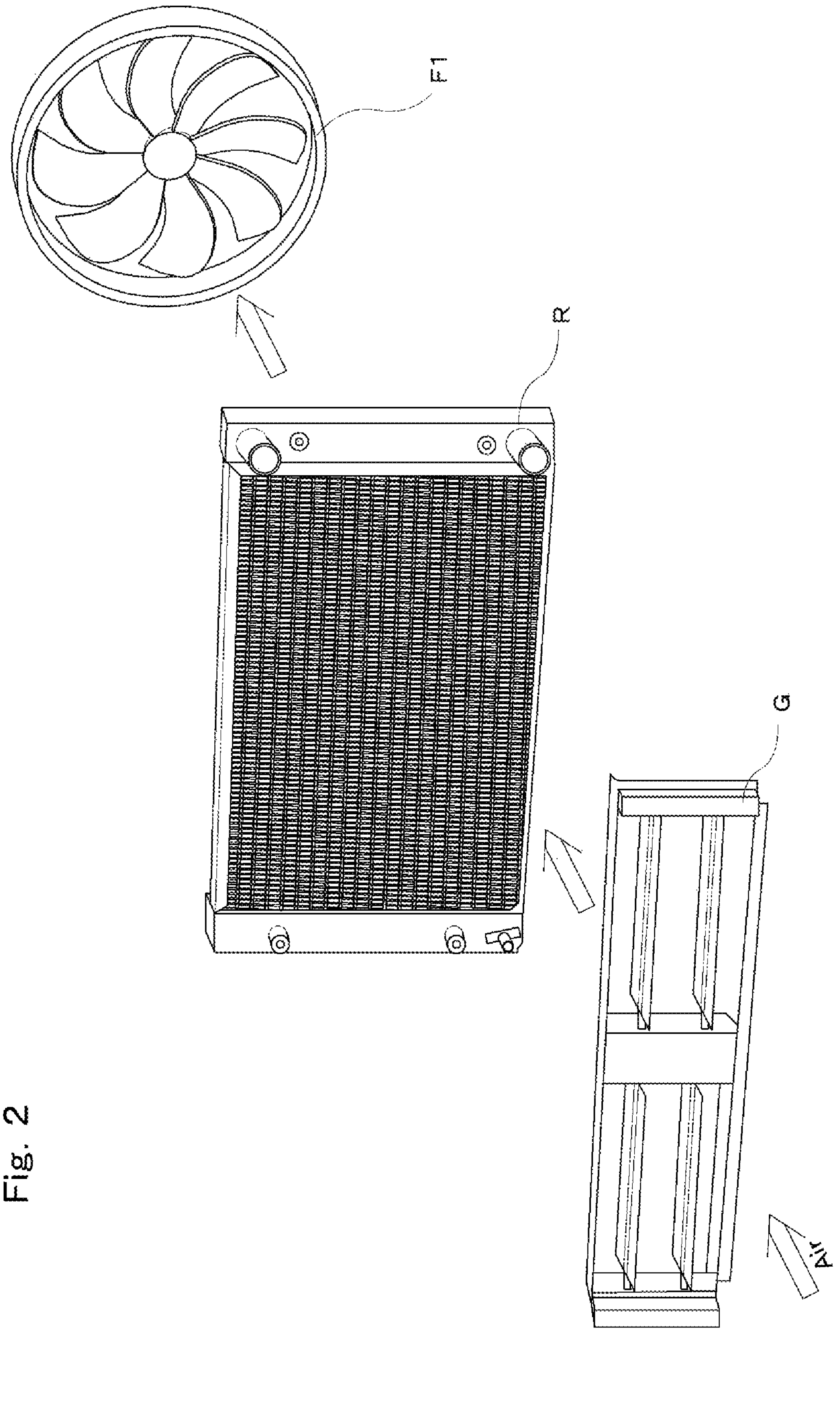

The application site will now be described with reference to FIG. 2. When an openable/closable grill shutter G disposed between capacitor (not shown) near an air conditioner and a front grill or a radiator grill is open, ambient air is drawn in a car through the opening of the front grill while the car is traveling. The air drawn in the front grill flows through the opening of the grill shutter, the radiator R for cooling engines, and a fan F1 behind the radiator R, and then flows into the engine room containing the engine. Even if car stops, air flows from the front side to the radiator R side when the fun F1 rotates and air is drawn in the fun F1. The fun is being attached to the behind of the radiator R and can increase cooling efficiency of cooling water flowing in the radiator R. Even if car stops, ambient air is drawn in the opening of the front grill, and the air flows through the radiator R and the fan F1 behind the radiator R and flows into the engine room side. When the grill shutter G is close, ambient air inflow is blocked by the grill shutter G and fails to flow into the radiator R side.

The water-based paint composition of the present embodiment may be to be applied to the surface of the grill, the grill shutter G, the core of the radiator R, or the fun F1 and then dried to give the coating film on the surface. The grill, the grill shutter G, the core of the radiator R, and the fun F1 are located in an air flow passage, where air is flowing when a car is traveling or the fan F1 is rotating, and be in contact with air. Thus, the activated carbon and the manganese dioxide-based catalyst included the coating film formed on the surface of the grill, the grill shutter G, the core of the radiator R, and the fun F1 enable ozone in air being in contact with the coating film to be decomposed and enable air to be purified advantageously. In particular, the blades of the fan F1 have a plate shape and the grill and the grill shutter G has a barrier or screen shape with large openings. Thus, the water-based paint composition is to be applied to the surface of the fan F1, the grill, or the grill shutter G by easy application method such as spray and the surface is easily coated with the water-based paint composition.

Sunlight may be reached to car components such as the grill, the grill shutter G, the radiator R, and the fan F1 near the radiator R. The coating film of the water-based paint composition applied to the car components is resistant to chalking and weather and less peelable for a long term and long-lasting. Thus, the coating film exhibits ozone decomposition performance for a long term.

Besides the car components, the water-based paint composition of the present embodiment may be to be applied to blowers such as electric fun circulators, air conditioners, and air purifiers, which are exposed to air flow. The water-based paint composition applied to the blowers exposed to air flow allows ozone in air to be decomposed by the manganese oxide-based catalyst and the activated carbon included in the coating film of the water-based paint composition. This enables s decrease in ozone in the air advantageously. Thus, the blower can send air with reduced ozone. In particular, the coating film of the water-based paint composition of the present embodiment has high weather residence. Thus, the coating film applied to articles used in not only indoors but also articles used in outdoors such as blowers exposed to sunlight is less prone to chalking and less peelable and lasts longer. The coating film, which is suitable for use in articles exposed to sunlight, exhibits high performance to decompose ozone for a long term.

Figure 3:
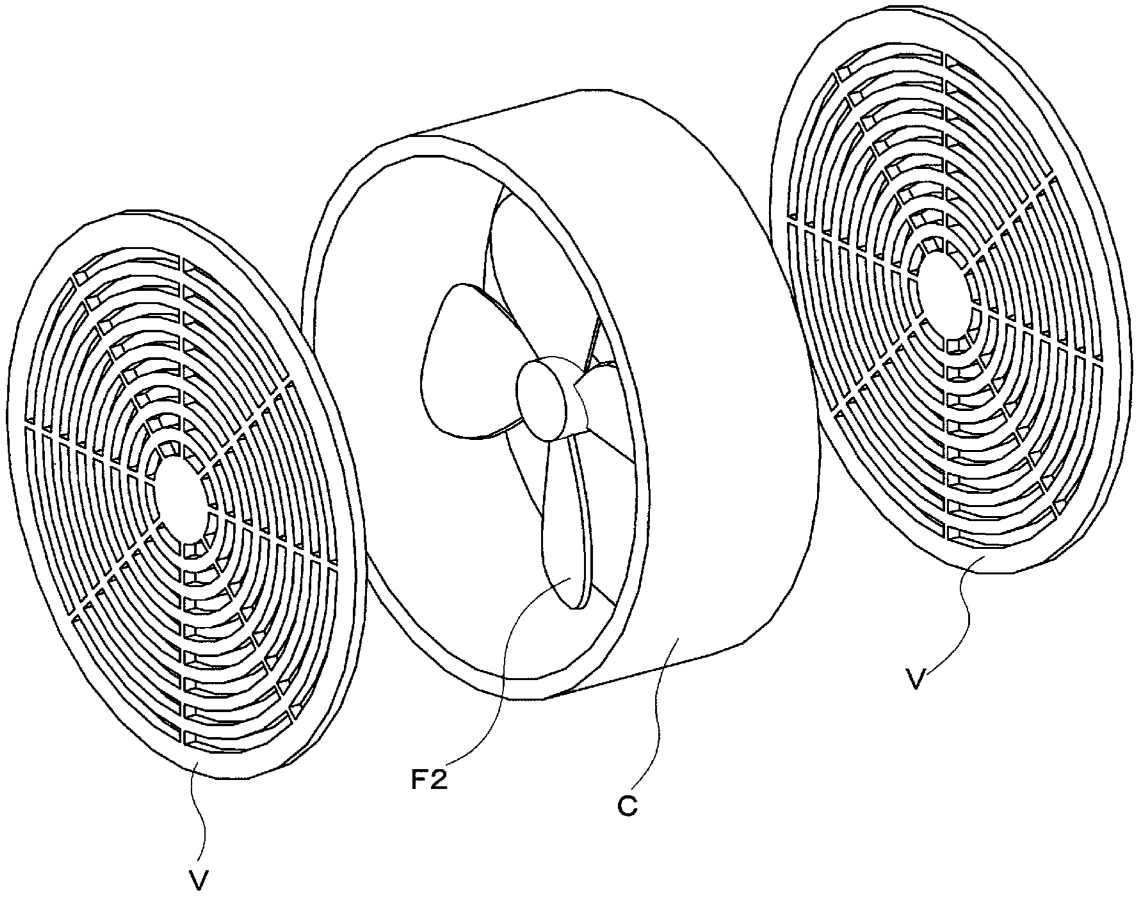

The application site will now be described with reference to FIG. 3. FIG. 3 shows a blower including a fan F2, a venting member or a filter V, a holder C, and a drive portion (not shown) including a motor. The fan F2 has rotary vanes 12 that draws in air and blows the air through rotating by motor-driving. The venting member V is located on the front and the back or the air intake side and the blow side of the rotary vanes 12. The holder C with a cylindrical shape contains the fan F2 and has ends with the venting member V. The drive portion impacts rotational drive to the fan F2. The water-based paint composition of the present embodiment is to be applied to the fan F2, the venting member V, or the holder C of the blower and then dried to give the coating film thereon. For example, the water-based paint composition is to be applied to the vane of the fan F2, the whole or part of the surface of the venting member V, or the inner circumference of the holder C of the blower and then dried to give the coating film thereon. The manganese oxide-based catalyst and the activated carbon included in the coating film enable ozone in air to be decomposed and the air to be efficiently purified.

The fan 12 draws in air and blows the air. Examples of the fan 12 includes axial flow fans, propeller fans, centrifugal fans, sirocco fans, turbofans, diagonal flow fans, mixed flow fans, cross flow fans, tangential fans, line flow fans (registered trademark).

The venting member V, which is located in an air flow passage where the air is flowing through driving of the fan 12, allows air pass. The venting member V may be shaped, but not exclusively, in the form of concentric circles (referring to FIG. 3), meshes, honeycombs, fences, grids, radial lines or curves, or spirals, or have through holes shaped in a circle or a polygon such as a triangle or a square in cross section. The venting member V, which has gaps between parts or through holes, allows air to pass through the gaps or the holes. The venting member V with a honeycomb shape or an uneven shape has larger coated areas in contact with air to enable ozone to be reduced advantageously. In particular, the venting member V with a honeycomb shape can reduce pressure losses.

The holder C, which has a larger diameter than the fan F2 and accommodates the fan F2, guides intake-air through the rotational drive of the fun F2 and increases air blow.

The blower, including the fan F2 and the venting member V, may be supported by support-members such as tripods and pedestals and stood on a floor or ground, or placed on a floor or ground. Alternatively, the blower may be suspended. That is, the blower may be a floor standing type, a desktop type, a ceiling fixed type, or a wall fixed type.

When the water-based paint composition of the present embodiment is to be applied to the blower, the fan F2, which draws in air and blows the air, is to be coated with the water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component. The water-based paint composition applied to the fan F2 is then dried to give the hardened coating film, including the manganese oxide-based catalyst, the activated carbon, the water-soluble resin selected from the group consisting of the acrylic resin, the modified acrylic resin, and the fluorocarbon resin, formed on the fan F2.

The water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component is to applied to the fan F2 and then dried to give the coating film. Thus, the blower includes the fan F2, which draws in air and blows the air, and the coating film, including the manganese oxide-based catalyst, the activated carbon, the water-soluble resin selected from the group consisting of the acrylic resin, the modified acrylic resin, and the fluorocarbon resin, formed on the fan F2.

The blower also includes the venting member V through which air passes through rotating of the fan F2. Thus, the water-based paint composition including the manganese oxide-based catalyst, the activated carbon, the dispersant, the water-soluble resin selected from the group consisting of the acrylic resin, the modified acrylic resin, and the fluorocarbon resin, and the solvent including water as the major component may also to be applied to the venting member V. The water-based paint composition applied to the venting member V is then dried to give the hardened coating film, including the manganese oxide-based catalyst, the activated carbon, the water-soluble resin selected from the group consisting of the acrylic resin, the modified acrylic resin, and the fluorocarbon resin, formed on the venting member V. In particular, the venting member V such as a filter has a large area contacting with air. Thus, the hardened coating film formed on the venting member V allows ozone in air passing through the venting member V to be advantageously reduced.

The water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component is applied to the venting member V and then dried to give the coating film. Thus, the blower includes the fan F2, which draws in air and blows the air, the venting member V, through which air passes through rotating of the fan F2, and the coating film, including the manganese oxide-based catalyst, the activated carbon, the water-soluble resin selected from the group consisting of the acrylic resin, the modified acrylic resin, and the fluorocarbon resin, formed on the venting member V.

The blower also includes the holder C containing the fan F2. Thus, the water-based paint composition including the manganese oxide-based catalyst, the activated carbon, the dispersant, the water-soluble resin selected from the group consisting of the acrylic resin, the modified acrylic resin, and the fluorocarbon resin, and the solvent including water as the major component may also be to be applied to the holder C. The water-based paint composition applied to the holder C is then dried to give the hardened coating film, including the manganese oxide-based catalyst, the activated carbon, the water-soluble resin selected from the group consisting of the acrylic resin, the modified acrylic resin, and the fluorocarbon resin, formed on the holder C.

The water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component is applied to the holder C and then dried to give the coating film. Thus, the blower includes the fan F2, which draws in air and blows the air, the venting member V, through which air passes through rotating of the fan F2, the holder C containing the fan F2, and the coating film, including the manganese oxide-based catalyst, the activated carbon, the water-soluble resin selected from the group consisting of the acrylic resin, the modified acrylic resin, and the fluorocarbon resin, formed on the holder C.

The water-based paint composition is applied to the blower with a site which flowing air is contact with and then dried to give the hardened coating film formed on the site. This hardened coating film includes the manganese oxide-based catalyst, the activated carbon and thus decompose ozone in the flowing air. Therefore, the blower coated with the hardened coating film decrease ozone in air and blows air with decreased ozone. This enables air to be advantageously purified.

Ozone damages plants and adversely affects agricultural crops and horticultural crops, for example, causes decrease in growth crop and yield. In a house for cultivating crops or plants, using the blower coated with the hardened coating film including the manganese oxide-based catalyst, the activated carbon, the water-soluble resin selected from the group consisting of the acrylic resin, the modified acrylic resin, and the fluorocarbon resin enables decease in ozone within the house and prevents crop damage due to ozone. That is, an air conditioning with the blower coated with the hardened coating film including the manganese oxide-based catalyst, the activated carbon, the water-soluble resin selected from the group consisting of the acrylic resin, the modified acrylic resin, and the fluorocarbon resin decreases in ozone in air and allows a space to have decreased ozone.

The water-based paint composition may be to be applied to a blower used in an air conditioning of households or factories, or others, for example, rolling stocks, ships, aircrafts, building structures, construction equipment, office equipment generating ozone, electrical equipment such as dry copies, ozonizers, ultraviolet lamps, air purifiers for deodorization, sterilization or bleaching. Specifically, the water-based paint composition may be to be applied to the housing of a purifier, the housing of an ozonizer such as a high-voltage generator or a corona charge device, an exhaust filter, an exhaust duct, or an exhaust fan. This results in decrease in ozone in air.

A room using an air purifier using ozone for virus sterilization or deodorization, specifically, a space for sterilizing medical instruments has strange odor due to residual ozone. To remove such residual ozone, the water-based paint composition may be to be applied to the walls of the room or a blower in an air conditioning system of the room. The coating film of the water-based paint composition includes the manganese oxide-based catalyst and the activated carbon and thus can decompose the residual ozone in the room to provide an improved work environment.

The water-based paint composition is to be applied to the surface of a site exposed to air to give the hardened coating film formed on the surface. The surface coated with the hardened coating film provides performance to decompose ozone. Coating the surface of a site exposed to air with the water-based paint composition allows decrease in ozone in air. The water-based paint composition includes the manganese oxide-based catalyst and the activated carbon that are finely dispersed to have a viscosity suitable for application. The water-based paint composition is to be applied to a base. This water-based paint composition is easily prepared and to be applied to various articles, items, or sites to contribute to air purification.

The hardened coating film of the water-based paint composition is highly resistant to weather. Even when the water-based paint composition is applied to articles including goods, products, and components used out of doors, that is, articles including goods, products, and components exposed to sunlight, such as an outer wall and an exterior material, the hardened coating film formed on such parts are less prone to chalking and have durability. Thus, the hardened coating film exhibits long serve life and high performance to decompose ozone for a long term.

The water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component of the solvent is applied to a base and dried to give the hardened coating film formed on the base. This yields a coated article including the base and the coating film formed on the base. That is, the coated article includes the base coated with the hardened coating film including the manganese oxide-based catalyst, the activated carbon, and the water-soluble resin selected from the group consisting of the acrylic resin, the modified acrylic resin, and the fluorocarbon resin.

Examples of the articles including the base include filters, fans, ducts, building materials, and agricultural/horticultural materials. These articles are exposed to air, preferably, in contact with air flow. The filters are used in car grilles, grille shutters, radiators, radiator fans, air conditioning equipment, blowers, air conditioners, copiers, or printers. Examples of the filters include fiber filters, non-wave filters, ceramic filters, resin filters, high efficiency particulate air filters or ULPA filters, and ultra low penetration air filters or ULPA filters. The fans are used in electric fans including bladeless fans, air circulators, air conditioners including outdoor unit, air purifiers including air purifiers with ozone for virus sterilization or deodorization, or ventilation fans. The ducts, for example, made of metals or resins, are used in air conditioning system. Examples of the ducts include supply air ducts, exhaust ducts, and air circulation ducts. The building materials include interior materials, exterior materials, walls, roofs, floors, ceilings, screens, windows, curtains, and fences. The agricultural or horticultural materials include plastic sheets for greenhouses, sheet or net or mulching materials for weeding, insect repellents, photosynthesis promotion, windbreaks, or keep warm, packaging materials such as vegetable bags, fruit bags, and gardening bags, seeding pots, soil conditioners, pumice stones, and pipes. The water-based paint composition of the present embodiment may be to be applied to a surface exposed to light including sunlight, for example, the surface of car components, blowers (including outdoor unit of air conditioners and electric circulating fans for agriculture) used out of door, filters, honeycomb members used out of door, horticultural materials including plastic sheets, or the roofs or the exterior walls of buildings. When the water-based paint composition is applied to such an exposed surface and dried to give the hardened coating film on the exposed surface, the hardened coating film is less prone to chalking and exhibits high durability and high performance to decompose ozone for a long term.

The water-based paint composition of the present embodiment should not be limited to be directly applied to a desire site to be coated. The water-based paint composition may be directly applied to a sheet such as polyvinyl chloride sheet including a release sheet or a separator and dried to give the hardened coating film on the sheets as substrates. The sheet coated with the hardened coating film may be then put on the desired site to give the hardened coating film on the desired site.

The hardened coating film of the present embodiment, which includes binder(s) selected from the group consisting of the acrylic resin, the modified acrylic resin, and the fluorocarbon resin, is resistant to chalking and weather even if the hardened coating film is formed on any base made of metal such as stainless, steel (SUS), and aluminum, slate, concrete, wood, or resin.

The water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component of the solvent is applied to the base and dried to give the hardened coating film including the manganese oxide-based catalyst, the activated carbon, the water-soluble resin selected from the group consisting of the acrylic resin, the modified acrylic resin, and the fluorocarbon resin on the base. The article including such a hardened coating film formed on the base allows ozone being in contact with the hardened coating film to be decomposed. In particular, the hardened coating film formed on the article exposed to air flow allows ozone in the air to decrease effectively and the air to be advantageously purified. Furthermore, the water-based paint composition including the manganese oxide-based catalyst, the activated carbon, the water-soluble resin selected from the group consisting of the acrylic resin, the modified acrylic resin, and the fluorocarbon resin, the dispersant, and the solvent including water as the major component of the solvent exhaust less volatile organic compounds (VOC) and is environmentally-friendly.

As described above, the water-based paint composition of the embodiment includes the manganese oxide-based catalyst, the activated carbon, the dispersant, the water-based solvent, and at least one of the acrylic resin, the modified acrylic resin, or the fluorocarbon resin as the water-soluble resin.

The water-based paint composition including the manganese oxide-based catalyst, the activated carbon, the dispersant, the water-based solvent, and at least one water-soluble resin selected from the group consisting of the acrylic resin, the modified acrylic resin, and the fluorocarbon resin is applied and hardened by drying to give a hardened coating film. This hardened coating film includes the manganese oxide-based catalyst, the activated carbon, and at least one water-soluble resin selected from the group consisting of the acrylic resin, the modified acrylic resin, and the fluorocarbon resin. That is, the hardened coating film of the embodiment includes the manganese oxide-based catalyst, the activated carbon, and at least one water-soluble resin selected from the group consisting of the acrylic resin, the modified acrylic resin, and the fluorocarbon resin.

The hardened coating film, which is formed by applying and drying the water-based paint composition, includes at least one binder selected from the group consisting of the acrylic resin, the modified acrylic resin, and the fluorocarbon resin. Thus, the hardened coating film, although including manganese oxide-based catalyst, is resistant to chalking and weather. Therefore, the hardened coating film applied to a base is less peelable from the base and more permanent and exhibit high performance to decompose ozone for long term even if the hardened coating film is applied to the base used in outdoor or exposed to light including sunlight.

The acrylic resin having a glass transition temperature $T_g$ of −30 to 130° C. and the modified acrylic resin having a glass transition temperature $T_g$ of −30 to 100° C. each allows the hardened coating film to increase in weather resistance and have good heat resistance.

The fluorocarbon resin having a glass transition temperature $T_g$ of −30 to 100° C., more preferably −25 to 90° C. allows the hardened coating film to increase in weather resistance and have good heat resistance.

The preferable total content of the manganese oxide-based catalyst and the activated carbon of 25 to 75 parts by mass, more preferably 30 to 65 parts by mass, per 100 parts by mass of the total content of the manganese oxide-based catalyst, the activated carbon, and the at least one water-soluble resin, enables the combination of high performance to decompose ozone and high weather resistance.

The preferable content of the water-soluble resin of 20 to 400 parts by mass, more preferably 25 to 350 parts by mass, further preferably 30 to 300 parts by mass, particularly preferably 30 to 300 parts by mass, per 100 parts by mass of the total content of the manganese oxide-based catalyst and the activated carbon, enables the combination of high performance to decompose ozone and high weather resistance.

The preferable content of the water-soluble resin of 30 to 500 parts by mass, more preferably, 40 to 480 parts by mass, further preferably 45 to 450 parts by mass, particularly preferably 70 to 400 parts by mass, per 100 parts by mass of the manganese oxide-based catalyst, enables the combination of high performance to decompose ozone and high weather resistance.

The preferable content of the manganese oxide-based catalyst of 5 to 65 parts by mass, more preferably 10 to 60 parts by mass, further preferably 15 to 55 parts by mass, particularly preferably 18 to 50 parts by mass, per 100 parts by mass of the content of the manganese oxide-based catalyst, the activated carbon, and the at least one water-soluble resin, enables the combination of high performance to decompose ozone and high weather resistance.

The preferable content of the manganese oxide-based catalyst of 11 to 900 parts by mass, more preferably 15 to 800 parts by mass, further preferably 20 to 700, parts by mass per 100 parts by mass of the content of the activated carbon, enables the combination of high coatability and high weather resistance.

The above description includes an ozone decomposition method. That is, the hardened coating film including the manganese oxide-based catalyst, the activated carbon, the water-soluble resin selected from the group consisting of the acrylic resin, the modified acrylic resin, and the fluorocarbon resin is in contact with air to allow ozone in the air to be decomposed.

The above description includes an invention of a method of forming the hardened coating film. That is, the water-based paint composition including the manganese oxide-based catalyst, the activated carbon, the dispersant, at least one water-soluble resin selected from the group consisting of the acrylic resin, the modified acrylic resin, and the fluorocarbon resin, the pH adjuster and the water-based solvent is applied to a target and dried to form the hardened coating film. Such a method provides the hardened coating film that exhausts less volatile organic compounds (VOC) since water is a main solvent in the water-based paint composition. Additionally, when the water-based paint composition is to be applied to a base and hardened, the work environment is good and the water-based paint composition is environmentally-friendly.

Furthermore, the above description includes an invention of a coated article with a hardened coating film formed on a base. The hardened coating film includes the manganese oxide-based catalyst, the activated carbon, at least one water-soluble resin selected from the group consisting of the acrylic resin, the modified acrylic resin, and the fluorocarbon resin.

With respect to components, formulations, contents, shapes, quantity, material properties, dimensions of the water-based paint composition, the hardened coating film thereof, and the coated article thereof, the above-mentioned embodiment is not intended to limit the present invention. In addition, not all of the numeric values described in the present embodiment indicate a critical value, and a certain numeric value indicates a preferred value for the embodiment. A little variation is acceptable without departing from the scope and sprit of the present invention.

The invention claimed is:

1. A water-based paint composition, comprising:
a manganese oxide-based catalyst;
activated carbon;
a water-soluble resin;
a dispersant; and
a water-based solvent;
wherein the water-soluble resin is a fluorocarbon resin having a glass transition temperature Tg of −30 to 100° C., and
a content of the water-soluble resin is in a range of 20 to 400 parts by mass per 100 parts by mass of a total content of the manganese oxide-based catalyst and the activated carbon.

2. The water-based paint composition according to claim 1, wherein the fluorocarbon resin is polytetrafluoroethylene, perfluoro alkoxy alkane, perfluoro ethylene propylene copolymer, tetrafluoroethylene hexafluoropropylene, copolymer-ethylene-tetrafluoroethylene, polychlorotrifluoroethylene, or chlorotrifluoroethylene ethylene.

* * * * *